US009348044B2

(12) United States Patent
Xu et al.

(10) Patent No.: US 9,348,044 B2
(45) Date of Patent: May 24, 2016

(54) VECTORIZATION OF FAST FOURIER TRANSFORM FOR ELASTIC WAVE PROPOGATION FOR USE IN SEISMIC UNDERWATER EXPLORATION OF GEOGRAPHICAL AREAS OF INTEREST

(71) Applicant: CGGVERITAS SERVICES SA, Massy (FR)

(72) Inventors: Sheng Xu, Katy, TX (US); Feng Chen, Pearland, TX (US)

(73) Assignee: CGG SERVICES SA, Massy (FR)

( * ) Notice: Subject to any disclaimer, the term of this patent is extended or adjusted under 35 U.S.C. 154(b) by 514 days.

(21) Appl. No.: 13/865,614

(22) Filed: Apr. 18, 2013

(65) Prior Publication Data

US 2013/0279293 A1     Oct. 24, 2013

Related U.S. Application Data

(60) Provisional application No. 61/635,390, filed on Apr. 19, 2012.

(51) Int. Cl.
*G01V 1/38* (2006.01)
*G01V 1/28* (2006.01)

(52) U.S. Cl.
CPC ....... *G01V 1/282* (2013.01); *G01V 1/28* (2013.01); *G01V 2210/67* (2013.01); *G01V 2210/675* (2013.01)

(58) Field of Classification Search
CPC ...... G01V 1/28; G01V 1/282; G01V 2210/67; G01V 2210/675
USPC .................. 367/21, 37, 38, 73; 702/14, 16
See application file for complete search history.

(56) References Cited

U.S. PATENT DOCUMENTS 6,317,695 B1 *  11/2001  Zhou et al. ..................... 702/17
2013/0173169 A1 *  7/2013  Pan ................................. 702/17

OTHER PUBLICATIONS

E. Baysal, et al., "Reverse Time Migration", Geophysics, vol. 48, No. 11, Nov. 1983, p. 1514-1524.
J.W. Cooley, et al., "An Algorithm for the Machine Calculation of Complex Fourier Series", Math Comput 19 (90); pp. 297-301.
E. Duveneck, et al., "Stable P-Wave Modeling for Reverse-Time Migration in Titlted TI Media", Geophysics, vol. 76, No. 2, Mar.-Apr. 2011, pp. S65-S75.

(Continued)

*Primary Examiner* — Ian J Lobo
(74) *Attorney, Agent, or Firm* — Patent Portfolio Builders PLLC

(57) ABSTRACT

Numerical simulations of elastic wave propagation algorithms are critical components for seismic imaging and inversion. Finite-difference schemes yield good efficiency but cannot ensure the accuracy of the high frequency component. Pseudo-spectral algorithms are accurate up to the Nyquist frequency, but its efficiency depends on the optimization of the fast Fourier transform (FFT) algorithm. The conventional FFT algorithms are optimized for signal processing, in which problems are generally one dimensional time series. For 3D wave propagation, FFT algorithms have the potential to be further optimized. Under current computer hardware architecture, a vectorization scheme for high dimensional FFTs is presented. Compared to conventional numerical scheme implementations, the systems and methods disclose herein has the best performance on the slowest or higher dimensions of data. For elastic wave propagation, vectorization improves the efficiency by more than a factor of two when compared to standard FFT algorithms.

16 Claims, 12 Drawing Sheets

(56) References Cited

OTHER PUBLICATIONS

M. Frigo, et al., "The Design and Implementation of FFTW3", Proceedings of the IEEE, vol. 93, No. 2, 2005, pp. 216-231.

J. Gazdag, "Modeling of the Acoustic Wave Equation with Transform Methods", Geophysics, vol. 46, No. 6, Jun. 1981, pp. 854-859.

M. T. Heideman, et al., "Gauss and the History of the Fast Fourier Transform".

D. D. Kosloff, et al., "Forward Modeling by a Fourier Method", Geophysics, vol. 47, No. 10, Oct. 1982, pp. 1402-1412.

X. Song, et al., "Fourier Finite-Difference Wave Propagation", Geophysics, vol. 76, No. 5, 2010, pp. 3204-3209.

Y. Zhang, et al., "A Stable TTI Reverse Time Migration and its Implementation", Geophysics, vol. 76, No. 3, May-Jun. 2011, pp. WA3-WA11.

H. Zhang, et al., "Reverse Time Migration in Vertical and Tilted Orthorhombic Media", SEG, Expanded Abstracts, vol. 30, No. 1, 2011, pp. 185-189.

H. Zhou, et al., "An Anisotropic Acoustic Wave Equation for VTI Media", EAGE, Extended Abstracts, H033, Jun. 12-15, 2006.

\* cited by examiner

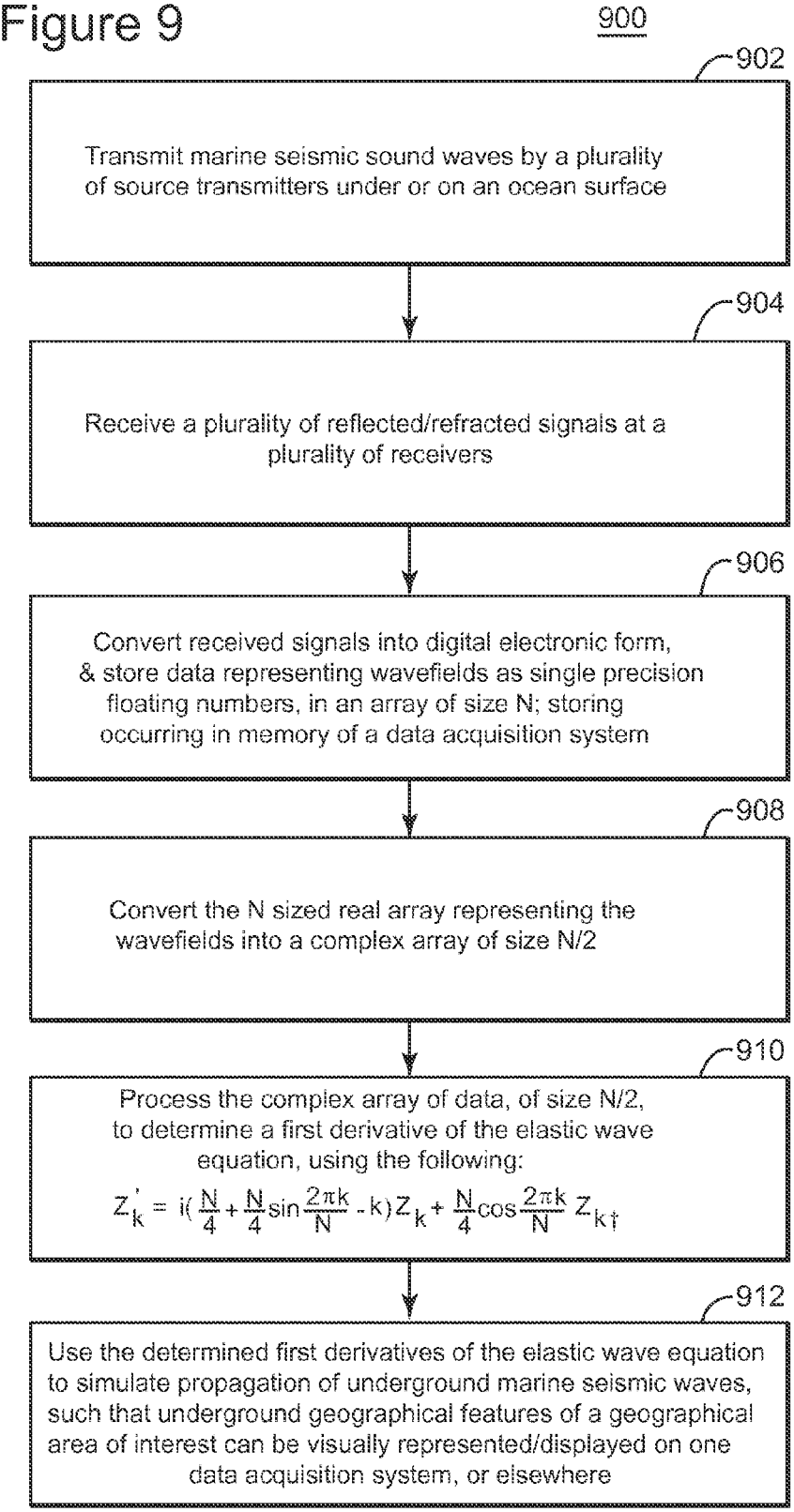

Figure 9

902 — Transmit marine seismic sound waves by a plurality of source transmitters under or on an ocean surface 904 — Receive a plurality of reflected/refracted signals at a plurality of receivers 906 — Convert received signals into digital electronic form, & store data representing wavefields as single precision floating numbers, in an array of size N; storing occurring in memory of a data acquisition system 908 — Convert the N sized real array representing the wavefields into a complex array of size N/2

910 — Process the complex array of data, of size N/2, to determine a first derivative of the elastic wave equation, using the following:

$$Z'_k = i(\frac{N}{4} + \frac{N}{4}\sin\frac{2\pi k}{N} - k)Z_k + \frac{N}{4}\cos\frac{2\pi k}{N} Z_{k\dagger}$$

912 — Use the determined first derivatives of the elastic wave equation to simulate propagation of underground marine seismic waves, such that underground geographical features of a geographical area of interest can be visually represented/displayed on one data acquisition system, or elsewhere

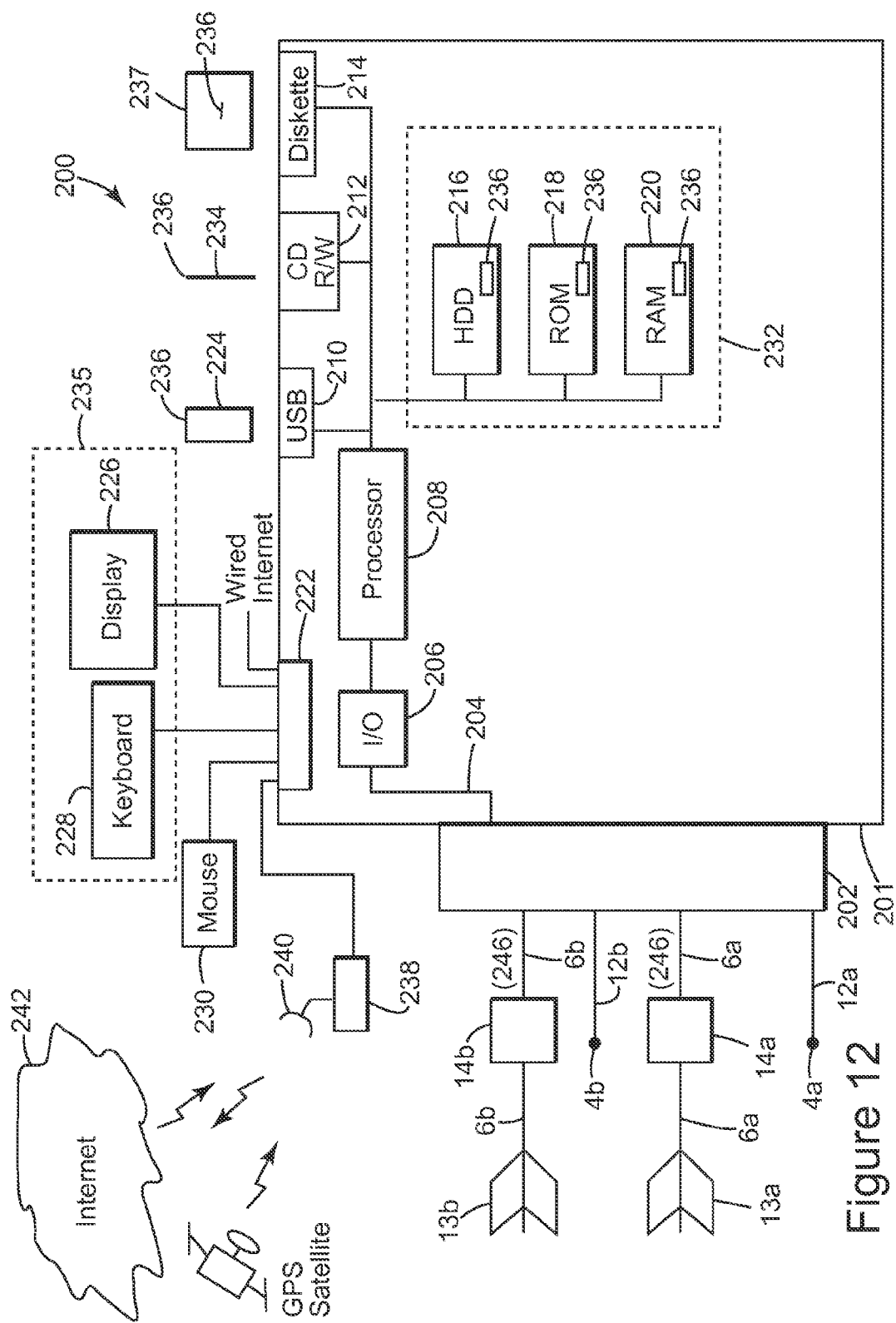

VECTORIZATION OF FAST FOURIER TRANSFORM FOR ELASTIC WAVE PROPOGATION FOR USE IN SEISMIC UNDERWATER EXPLORATION OF GEOGRAPHICAL AREAS OF INTEREST

PRIORITY INFORMATION

The present application claims priority under 35 U.S.C. §119(e) to U.S. Provisional Patent Application Ser. No. 61/635,390, filed Apr. 19, 2012, the entire contents of which are expressly incorporated herein by reference.

TECHNICAL FIELD

The embodiments discussed herein relate generally to processing of received marine seismic signals, and more specifically to systems and methods for increasing the processing speed using improved fast Fourier transforms systems and methods.

BACKGROUND

A widely used technique for searching for oil or gas is the seismic exploration of subsurface geophysical structures. Reflection seismology is a method of geophysical exploration to determine the properties of a portion of a subsurface layer in the earth, which information is especially helpful in the oil and gas industry. The seismic exploration process consists of generating seismic waves (i.e., sound waves) directed toward the subsurface area, gathering data on reflections of the generated seismic waves at interfaces between layers of the subsurface, and analyzing the data to generate a profile (image) of the geophysical structure, i.e., the layers of the investigated subsurface. This type of seismic exploration can be used both on the subsurface of land areas and for exploring the subsurface of the ocean floor.

Marine reflection seismology is based on the use of a controlled source that sends energy waves into the earth, by first generating the energy waves in or on the ocean. By measuring the time it takes for the reflections to come back to one or more receivers (usually very many, perhaps in the order of several dozen, or even hundreds), it is possible to estimate the depth and/or composition of the features causing such reflections. These features may be associated with subterranean hydrocarbon deposits.

For marine applications, seismic sources are essentially impulsive (e.g., compressed air is suddenly allowed to expand). One of the most used sources is air guns. The air guns produce a high amount of acoustics energy over a short time. Such a source is towed by a vessel either at the water surface or at a certain depth. The acoustic waves from the air guns propagate in all directions. A typical frequency range of the acoustic waves emitted by the impulsive sources is between 6 and 300 Hz. However, the frequency content of the impulsive sources is not fully controllable and different sources are selected depending on the needs of a particular survey. In addition, the use of impulsive sources can pose certain safety and environmental concerns. Thus, another class of sources that may be used is marine vibratory sources. The marine vibrator (or air gun) can also generally be referred to as a "source," i.e., a source of the sound/energy waves that are transmitted and then reflected/refracted off the ocean floor and then received by one or more, usually dozens, of receivers.

Marine vibratory sources, including hydraulically powered sources and sources employing piezoelectric or magneto-strictive material, have been used in marine operations. A marine vibrator generates a long tone with a varying frequency, i.e., a frequency sweep. This signal is applied to a moving port, e.g., a piston, which generates a corresponding seismic wave. Instantaneous pressure resulting from the movement of plural pistons corresponding to plural marine vibrators may be lower than that or an airgun array, but total acoustic energy transmitted by the marine vibrator may be similar to the energy of the airgun array due to the extended duration of the signal. However, such sources need a frequency sweep to achieve the required energy.

It is known by those of skill in the art of seismic exploration that an appropriate choice of frequencies of the frequency sweep is needed to drive the sound producing device that generate seismic waves whose reflections can, in turn, be used to determine the possible or probable location of hydrocarbon deposits under, e.g., the ocean floor. Sweep design pertains to the choice of frequencies used to drive a sound producing device used for determining the possible or probable location of hydrocarbon deposits under, e.g., the ocean floor. A sweep is a sinusoid with a continuously variable frequency, and can be defined by its amplitude $A(f)$, its begin and end frequency, and its sweep rate $Sr(f)$. Provided the sweep is long enough (longer than 5 or 6 seconds), the amplitude spectrum of the sweep at frequency f is proportional to $A(f)$ and to the square root of $Sr(f)$. Target-oriented sweep design (i.e., searching for a particular known type of hydrocarbon, in a particular known type of geological formation) consists in defining $A(f)$ and $Sr(f)$ to obtain the desired Signal-to-Noise ratio (SNR) of the target reflection.

Non-linear sweeps were introduced in late 1970s. At that time, the purpose of these sweeps was to generate a higher proportion of high frequencies that are attenuated by non-elastic wave propagation. The limited flexibility of the available software allowed the choice between a very small amplification, which did not significantly differ from conventional linear sweeps, and larger amplifications, which being constant over the entire frequency range often resulted in a damaging reduction in the low frequency content. This drawback was noticed and more sophisticated electronics were developed to allow more flexibility. An example of such a technique contributing to an enhancement was shown by D. Mougenot in 2002, as shown in FIG. 3. FIG. 3 illustrates a comparison of conventional (line A) and segmented logarithmic sweeps (line B). It can be readily observed in FIG. 3 that line A represents a linear rate of change of the sweep frequency, beginning at about 10 Hz, and changing linearly to about 120 Hz, over a 20 second period of time. Note that the relative amplitude of the transmitted signal also changes over time, from about 10-15 dB to about 55 dB by the end of the sweep period. The sweep proposed by Mougenot and Meunier in 2002 began at about 10 Hz, and proceeds to about 43 Hz over a two second period of time, but at about a constant (or linear) gain of 35 dB. Then, the sweep frequency changes from about 43 Hz to about 71 Hz over a two second period of time, and changes in amplitude from about 35 dB to about 37-38 dB. Finally, in the last phase, the sweep frequency changes from about 71 Hz at about 37-38 dB to 133 Hz and just over 60 dB in a 26 second time period. With such a change in the amplitude and frequencies over time, some gains were realized in maintaining low frequency content, without sacrificing the higher frequency affects. However, even with the realized benefits, there remained problems with the sweep frequencies. These problems include stroke limitations (i.e., the length of the movement of the piston) in the generation of low frequencies, and various physical constraints of the seismic vibrator and/or medium within which it operates, Marine vibrators (herein after referred to as "vibrators," "marine vibrators," and/or "seismic vibrators," or more simply as "sources") can be implemented in what are referred to as "towed arrays" of the plurality of sources and their receivers, wherein each towed array can include numerous vibrators, numerous receivers, and can include several or more groups of receivers, each on its own cables, with a corresponding source, again on its own cable. Systems and methods for their use have been produced for devices that can maintain these cables, for example, in relatively straight lines as they are being towed behind ships in the ocean. As those of ordinary skill in the art can appreciate, an entire industry has been created to explore the oceans for new deposits of hydrocarbons, and has been referred to as "reflection seismology."

For a seismic gathering process, as shown in FIG. 1, a data acquisition system 10 includes a ship 2 towing plural streamers 6 that may extend over kilometers behind ship 2. Each of the streamers 6 can include one or more birds 13 that maintains streamer 6 in a known fixed position relative to other streamers 6, and the birds 13 are capable of moving streamer 6 as desired according to bi-directional communications birds 13 can receive from ship 2. One or more source arrays 4a,b may be also towed by ship 2 or another ship for generating seismic waves. Source arrays 4a,b can be placed either in front of or behind receivers 14, or both behind and in front of receivers 14. The seismic waves generated by source arrays 4a,b propagate downward, reflect off of, and penetrate the seafloor, wherein the refracted waves eventually are reflected by one or more reflecting structures (not shown in FIG. 1) back to the surface (see FIG. 2, discussed below). The reflected seismic waves propagate upwardly and are detected by receivers 14 provided on streamers 6. This process is generally referred to as "shooting" a particular seafloor area, and the seafloor area can be referred to as a "cell".

FIG. 2 illustrates a side view of the data acquisition system 10 of FIG. 1. Ship 2, located on ocean surface 46, tows one or more streamers 6, that is comprised of cables 12, and a plurality of receivers 14. Shown in FIG. 2 are two source streamers, which include sources 4a,b attached to respective cables 12a,b. Each source 4a,b is capable of transmitting a respective sound wave, or transmitted signal 20a,b. For the sake of simplifying the drawings, but while not detracting at all from an understanding of the principles involved, only a first transmitted signal 20a will be shown (even though some or all of source 4 can be simultaneously (or not) transmitting similar transmitted signals 20). First transmitted signal 20a travels through ocean 40 and arrives at first refraction/reflection point 22a. First reflected signal 24a from first transmitted signal 20a travels upward from ocean floor 42, back to receivers 14. As those of skill in the art can appreciate, whenever a signal—optical or acoustical—travels from one medium with a first index of refraction n1 and meets with a different medium, with a second index of refraction n2, a portion of the transmitted signal is reflected at an angle equal to the incident angle (according to the well-known Snell's law), and a second portion of the transmitted signal can be refracted (again according to Snell's law).

Thus, as shown in FIG. 2, first transmitted signal 20a generates first reflected signal 24a, and first refracted signal 26a. First refracted signal 26a travels through sediment layer 16 (which can be generically referred to as first subsurface layer 16) beneath ocean floor 42, and can now be considered to be a "new" transmitted signal, such that when it encounters a second medium at second refraction/reflection point 28a, a second set of refracted and reflected signals 32a and 30a, are subsequently generated. Further, as shown in FIG. 2, there happens to be a significant hydrocarbon deposit 44 within a third medium, or solid earth/rock layer 18 (which can be generically referred to as second subsurface layer 18). Consequently, refracted and reflected signals are generated by the hydrocarbon deposit, and it is the purpose of data acquisition system 10 to generate data that can be used to discover such hydrocarbon deposits 44.

The signals recorded by seismic receivers 14 vary in time, having energy peaks that may correspond to reflectors between layers. In reality, since the sea floor and the air/water are highly reflective, some of the peaks correspond to multiple reflections or spurious reflections that should be eliminated before the geophysical structure can be correctly imaged. Primary waves suffer only one reflection from an interface between layers of the subsurface (e.g., first reflected signal 24a). Waves other than primary waves are known as multiples. Surface multiple signal 50a shown in FIG. 2 is one such example of a multiple, but as shown in FIG. 3, there are other ways for multiples to be generated.

As illustrated in FIG. 3, seismic source 4 produces first transmitted wave 20a that splits into a primary transmitted wave 26a (referred to also as first refracted signal) penetrating inside first subsurface layer 16 (referred to also as "sediment layer" though that does not necessarily need to be the case) under ocean floor 42, and first reflected signal 24a that becomes surface multiple signal 50 after it interfaces with ocean surface 46 (or fourth interface). Second transmitted wave 20b is reflected once at second interface 48 and becomes second reflected signal 24b, and then is reflected down again at ocean floor 42 to become internal multiple signal 51. Internal multiple signal 51 and surface multiple signal 50 also reaches receiver 14, but at different times. Thus, receiver 14 can receive at least several different signals from the same transmitting event: second reflected signal 30a, surface multiple signal 50, and internal multiple signal 51.

As is apparent from FIG. 3, the timing of the received signals will depend on the depth of the ocean 40, its temperature, density, and salinity, the depth of sediment layer 16, and what it is made of.

Thus, receiver 14 can become "confused" as to the true nature of the subsurface environment due to reflected signals 30, and multiple signals 50, 51. As briefly discussed above, other multiples can also be generated, some of which may also travel through the subsurface. A multiple, therefore, is any signal that is not a primary reflected signal. Multiples, as is known by those of ordinary skill in the art, can cause problems with determining the true nature of the geology of the earth below the ocean floor. Multiples can be confused by data acquisition system 10 with first, second or third reflected signals. Multiples do not add any useful information about the geology beneath the ocean floor, and thus they are, in essence, noise, and it is desirable to eliminate them and/or substantially reduce and/or eliminate their influence in signal processing of the other reflected signals so as to correctly ascertain the presence (or the absence) of underground/underwater hydrocarbon deposits.

Internal multiple signals 51 typically arise due to a series of subsurface impedance contrasts. They are commonly observed in seismic data acquired in various places, such as the Santos Basin of Brazil. They are often poorly discriminated from the primaries (i.e., the first, second and third reflected signals, among others), because they have similar movement, dips and frequency bandwidth, thereby making attenuation and/or elimination of internal multiple signals 51 (as well as surface multiples 50) one of the key issues in providing clear seismic images in interpreting areas of interest. Over time, various methods have been developed to address this difficult problem and most of them rely on the ability to identify the multiple generators.

As those of skill in the art can further appreciate, numerical simulations of elastic wave propagation algorithms are the critical components for seismic imaging and inversion. Following the data collection as described in detail above, it is the processing of the collected data that yields tangible, real results, albeit displayed on a computer screen and/or printed, that shows where hydrocarbons are probably located, and equally important, where they are not. It is known that marine seismic data can be interpreted to be an image or representation of the elastic properties of the different sub-surface components and the ocean water, and must be transformed from a scalar or vector quantity, recorded in time, to spatial quantities representing some useful attribute of the reservoir, or sub-surface areas. Ideal "elastic waves" are a mechanical disturbance that propagates through a material, causing oscillations of the particles of that material about their equilibrium positions but no other change, changes in position of, or deformation of, the material itself. Numerous methods exist for interpreting data presuming behavior that conforms to elastic wave propagation. There are numerous problems, however, with these known methods. Some of these methods include finite difference schemes and pseudo-spectral algorithms. Finite-difference methods (or schemes) are numerical methods for approximating the solutions to differential equations using finite difference equations to approximate derivatives. Finite-difference schemes exhibit high efficiency in obtaining results, but cannot ensure the accuracy of high frequency components; thus, their utility in marine seismic analysis can be somewhat limited. Pseudo-spectral algorithms are accurate up to the Nyquist frequency, but their efficiency depends on the optimization of the Fast Fourier transform (FFT) algorithm. Conventional FFT algorithms are optimized for signal processing (usually in communications systems), in which the problems are generally one dimensional time series. Accordingly, it would be desirable to provide methods, modes and systems optimizing interpretation of elastic wave propagation data in marine seismic data collection systems and devices.

SUMMARY

An aspect of the embodiments is to substantially solve at least one or more of the problems and/or disadvantages discussed above, and to provide at least one or more of the advantages described below.

It is therefore a general aspect of the embodiments to provide a system and method that will obviate or minimize problems of the type previously described. For three-dimensional (3D) elastic wave propagation, the FFT algorithm can be further optimized. Using current computer hardware architecture, a vectorization scheme for high dimensional FFT is implemented according to an embodiment. In comparison to conventional numerical scheme implementations, which have the greatest efficiency on the fastest dimension of data in memory, the system and method according to embodiments exhibits better performance on slower or higher dimensions of data. For elastic wave propagation, the vectorization implemented in the system and method according to embodiments improves the efficiency by more than a factor of two when compared to standard FFT algorithms.

According to a first aspect of the embodiments, a method for simulating and displaying wave propagation using reflection seismology in a geographical area of interest is provided comprising converting signals associated with marine seismic soundwaves into digital electronic form, and storing the same as single precision floating numbers in an array of size N, converting the real array of size N into a complex array of size N/2, determining a first derivative of the following elastic wave equation—

$$\rho(x)\frac{\partial^2 u_i}{\partial t^2} - \frac{\partial}{\partial x_j}C_{ijkl}\frac{\partial}{\partial x_l}u_k = f_i$$

using the following equation—

$$Z'_k = i\left(\frac{N}{4} + \frac{N}{4}\sin\frac{2\pi k}{N} - k\right)Z_k + \frac{N}{4}\cos\frac{2\pi k}{N}Z^*_{k_\dagger}$$

wherein said determination of the first derivative includes the determination of a fast Fourier transform using an FFT vectorization scheme, using the calculated derivatives of the elastic wave equation to determine wavefield propagation underground, and processing the calculated derivatives into data that can be used to display the determined wavefields so that underground geographical features in the underground geographical area of interest can be determined.

According to the first aspect, the step of determining a first derivative of the elastic wave equation comprises combining sequential pairs of even and odd real numbers of the N-sized real array to form a plurality of sequential complex numbers according to the following equation $$z_n = x_{2n} + ix_{2n+1} = x_n^{(e)} + ix_n^{(o)},$$

in which n=0, . . . , $$\frac{N}{2} - 1,$$

performing an FFT calculation of $z_n$ to obtain $Z_k$ using the FFT vectorization scheme, and then determining the complex conjugate and conjugate transpose of $Z_k$, $Z_{k_\dagger}^*$, using the following relationships to determine the first derivative, $Z'_k$, of the elastic wave equation by defining the frequency representation of $x_n^{(e)}$ and $x_n^{(o)}$ as—

$$X_k^{(e)} = \frac{1}{2}(Z_k + Z^*_{k_\dagger}) \text{ and } X_k^{(o)} = \frac{-i}{2}(Z_k - Z^*_{k_\dagger})$$

where k=0, . . .

$$\frac{N}{2} - 1, k_\dagger = \frac{N}{2} - k$$

and $z_k$ is the FFT of $z_n$, splitting the FFT of $z_n$ into a size-N real array of even and odd terms according to the following—

$$X_k = \sum_{n=0}^{\frac{N}{2}-1} x_n^{(e)} e^{-i\frac{2\pi kn}{N/2}} + e^{-i\frac{2\pi k}{N}} \sum_{n=0}^{\frac{N}{2}-1} x_n^{(o)} e^{-i\frac{2\pi kn}{N/2}} = X_k^{(e)} + e^{-i\frac{2\pi k}{N}}, \quad (6)$$

and therefore

-continued
$$X_k = \frac{1}{2}\left[(Z_k + Z_{k_\dagger}^*) - ie^{-i\frac{2\pi k}{N}}(Z_k - Z_{k_\dagger}^*)\right],$$

where k=0, ..., $$\frac{N}{2} - 1$$

and can be extended to k=N/2 by defining $Z_{N/2}=Z_0$, and $$X_{k_\dagger} = \frac{1}{2}\left[(Z_k + Z_{k_\dagger}^*) + ie^{-i\frac{2\pi k}{N}}(Z_k - Z_{k_\dagger}^*)\right]^*;$$

and
having determined $Z_k$ and $Z_{k_\dagger}^*$, determining the derivative of the elastic wave equation, $Z_k'$, according to the following—

$$Z_k' = i\left(\frac{N}{4} + \frac{N}{4}\sin\frac{2\pi k}{N} - k\right)Z_k + \frac{N}{4}\cos\frac{2\pi k}{N}Z_{k_\dagger}^*.$$

According to the first aspect, the step of determining a fast Fourier transform using an FFT vectorization scheme comprises storing a first set of data in memory, such that the data is configured in a first array of N rows, and M columns, reconfiguring the first array such that it is now comprises of N vectors each of length M, without moving any data of the first array, calculating an FFT of the data stored in the first array configured as N vectors each of length M using a vectorization scheme, and returning the FFT result. Still further according to the first aspect, the vectorization scheme is a streaming, single instruction, multiple data (SIMD) extension (SSE) scheme, and wherein the SSE is used to multiple a twiddle factor in the determination of the FFT.

According to the first aspect, the step of storing the data includes storing data in a three dimensional (3D) format, and further wherein the step of reconfiguring the first array includes determining that the set of vectors also includes Z sets of vectors, wherein each the Z sets of vectors includes N vectors of length M. According to the first aspect, the steps of storing and determining first derivatives of the elastic wave equation comprise storing three dimensional data in a three dimensional format, and determining the first derivatives in each of the three dimensions using an FFT vectorization scheme in a parallel manner, at substantially the same time.

According to a second aspect, a method for simulating and displaying wave propagation using reflection seismology in a geographical area of interest is provided comprising transmitting a plurality of marine seismic sound waves by a plurality of transmitters, receiving one or more of the plurality of transmitted signals by a plurality of receivers, converting the received signals into digital electronic form, and storing the same as single precision floating numbers in an array of size N, converting the real array of size N into a complex array of size N/2, determining a first derivative of the following elastic wave equation—

$$\rho(x)\frac{\partial^2 u_i}{\partial t^2} - \frac{\partial}{\partial x_j}C_{ijkl}\frac{\partial}{\partial x_l}u_k = f_i$$

using the following equation—

$$Z_k' = i\left(\frac{N}{4} + \frac{N}{4}\sin\frac{2\pi k}{N} - k\right)Z_k + \frac{N}{4}\cos\frac{2\pi k}{N}Z_{k_\dagger}^*$$

wherein said determination of the first derivative includes the determination of a fast Fourier transform using an FFT vectorization scheme, using the calculated derivatives of the elastic wave equation to determine wavefield propagation underground, and processing the calculated derivatives to visually display the determined wavefields so that underground geographical features in the underground geographical area of interest can be visually displayed and determined.

According to a third aspect a system for simulating and displaying wave propagation using reflection seismology in a geographical area of interest is provided comprising a processor configured to convert signals associated with marine seismic soundwaves into digital electronic form, and storing the same as single precision floating numbers in an array of size N, and wherein the processor is further configured to convert the real array of size N into a complex array of size N/2, determine a first derivative of the following elastic wave equation—

$$\rho(x)\frac{\partial^2 u_i}{\partial t^2} - \frac{\partial}{\partial x_j}C_{ijkl}\frac{\partial}{\partial x_l}u_k = f_i$$

using the following equation—

$$Z_k' = i\left(\frac{N}{4} + \frac{N}{4}\sin\frac{2\pi k}{N} - k\right)Z_k + \frac{N}{4}\cos\frac{2\pi k}{N}Z_{k_\dagger}^*$$

wherein said determination of the first derivative includes the determination of a fast Fourier transform using an FFT vectorization scheme, and further wherein the processor is further configured to use the calculated derivatives of the elastic wave equation to determine wavefield propagation underground, and process the calculated derivatives into data that can be used to display the determined wavefields so that underground geographical features in the underground geographical area of interest can be determined.

According to the third aspect, the determining of a first derivative of the elastic wave equation by the processor comprises the processor being further configured to combine sequential pairs of even and odd real numbers of the N-sized real array to form a plurality of sequential complex numbers according to the following equation $$z_n = x_{2n} + ix_{2n+1} = x_n^{(e)} + ix_n^{(o)},$$

in which n=0, ..., $$\frac{N}{2} - 1,$$

perform an FFT calculation of $z_n$ to obtain $Z_k$ using the FFT vectorization scheme, determine the complex conjugate and conjugate transpose of $Z_k$, $Z_{k_\dagger}^*$, use the following relationships to determine the first derivative, $Z_k'$, of the elastic wave equation by defining the frequency representation of $x_n^{(e)}$ and $x_n^{(o)}$ as—

$$X_k^{(e)} = \frac{1}{2}(Z_k + Z_{k\dagger}^*) \text{ and } X_k^{(o)} = \frac{-i}{2}(Z_k - Z_{k\dagger}^*)$$

where k=0, ...

$$\frac{N}{2} - 1, k_\dagger = \frac{N}{2} - k$$

and of $Z_k$ is the FFT of $z_n$, split the FFT of $z_n$ into a size-N real array of even and odd terms according to the following—

$$X_k = \sum_{n=o}^{\frac{N}{2}-1} x_n^{(e)} e^{-i\frac{2\pi k n}{N/2}} + e^{-i\frac{2\pi k}{N}} \sum_{n=o}^{\frac{N}{2}-1} x_n^{(o)} e^{-i\frac{2\pi k n}{N/2}} = X_k^{(e)} + e^{-i\frac{2\pi k}{N}},$$ (6)

and therefore $$X_k = \frac{1}{2}\left[(Z_k + Z_{k\dagger}^*) - ie^{-i\frac{2\pi k}{N}}(Z_k - Z_{k\dagger}^*)\right],$$

where k=0, ...

$$\frac{N}{2} - 1,$$

and can be extended to $$k = \frac{N}{2}$$

by defining $Z_{N/2}=Z_0$, and $$X_{k\dagger} = \frac{1}{2}\left[(Z_k + Z_{k\dagger}^*) + ie^{-i\frac{2\pi k}{N}}(Z_k - Z_{k\dagger}^*)\right]^*,$$

and
having determined $Z_k$ and $Z_{k\dagger}^*$, the processor is further configured to determine the derivative of the elastic wave equation, $Z_k'$, according to the following—

$$Z_k' = i\left(\frac{N}{4} + \frac{N}{4}\sin\frac{2\pi k}{N} - k\right)Z_k + \frac{N}{4}\cos\frac{2\pi k}{N} Z_{k\dagger}^*.$$

According to the third aspect, determining a fast Fourier transform using an FFT vectorization scheme by the processor comprises the processor being further configured to store a first set of data in memory, such that the data is configured in a first array of N rows, and M columns, reconfigure the first array such that it is now comprises of N vectors each of length M, without moving any data of the first array, calculate an FFT of the data stored in the first array configured as N vectors each of length M using a vectorization scheme, and return the FFT result.

According to the third aspect, the vectorization scheme is a streaming, single instruction, multiple data (SIMD) extension (SSE) scheme, and the SSE is used to multiple a twiddle factor in the determination of the FFT. Still further according to the third aspect, the storing of the data includes storing data by the processor in a three dimensional (3D) format, and further wherein reconfiguring the first array by the processor includes determining that the set of vectors also includes Z sets of vectors, wherein each the Z sets of vectors includes N vectors of length M.

According to the third aspect, storing and determining first derivatives of the elastic wave equation by the processor comprises the processor being further configured to store three dimensional data in a three dimensional format, and determine the first derivatives in each of the three dimensions using an FFT vectorization scheme in a parallel manner, at substantially the same time.

According to a fourth aspect, a system is provided for simulating and displaying wave propagation using reflection seismology in a geographical area of interest, the system comprising a plurality of transmitters configured to transmit a plurality of marine seismic sound waves, a plurality of receiver configured to receive one or more of the plurality of transmitted signals, and a processor configured to convert the received signals into digital electronic form, and storing the same as single precision floating numbers in an array of size N, convert the real array of size N into a complex array of size N/2, determine a first derivative of the following elastic wave equation—

$$\rho(x)\frac{\partial^2 u_i}{\partial t^2} - \frac{\partial}{\partial x_j} C_{ijkl} \frac{\partial}{\partial x_l} u_k = f_i$$

using the following equation—

$$Z_k' = i\left(\frac{N}{4} + \frac{N}{4}\sin\frac{2\pi k}{N} - k\right)Z_k + \frac{N}{4}\cos\frac{2\pi k}{N} Z_{k\dagger}^*$$

wherein said determination of the first derivative includes the determination of a fast Fourier transform using an FFT vectorization scheme, and wherein the processor is further configured to use the calculated derivatives of the elastic wave equation to determine wavefield propagation underground, and process the calculated derivatives to visually display the determined wavefields so that underground geographical features in the underground geographical area of interest can be visually displayed and determined.

BRIEF DESCRIPTION OF THE DRAWINGS

The above and other aspects and features of the embodiments will become apparent and more readily appreciated from the following description of the embodiments with reference to the following figures, wherein like reference numerals refer to like parts throughout the various figures unless otherwise specified, and wherein.

against N according to an embodiment.

Figure 8:
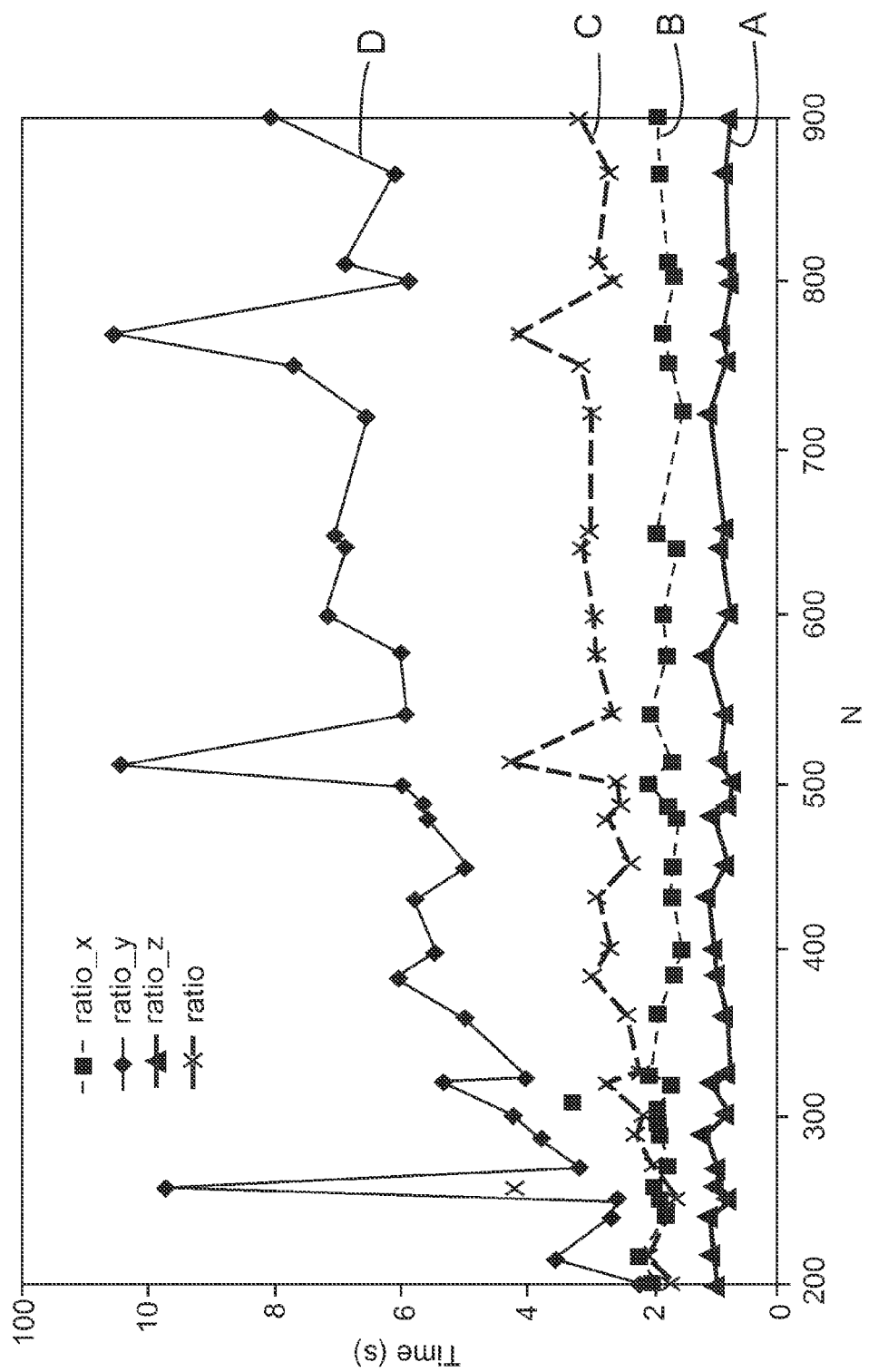
Figure 10:
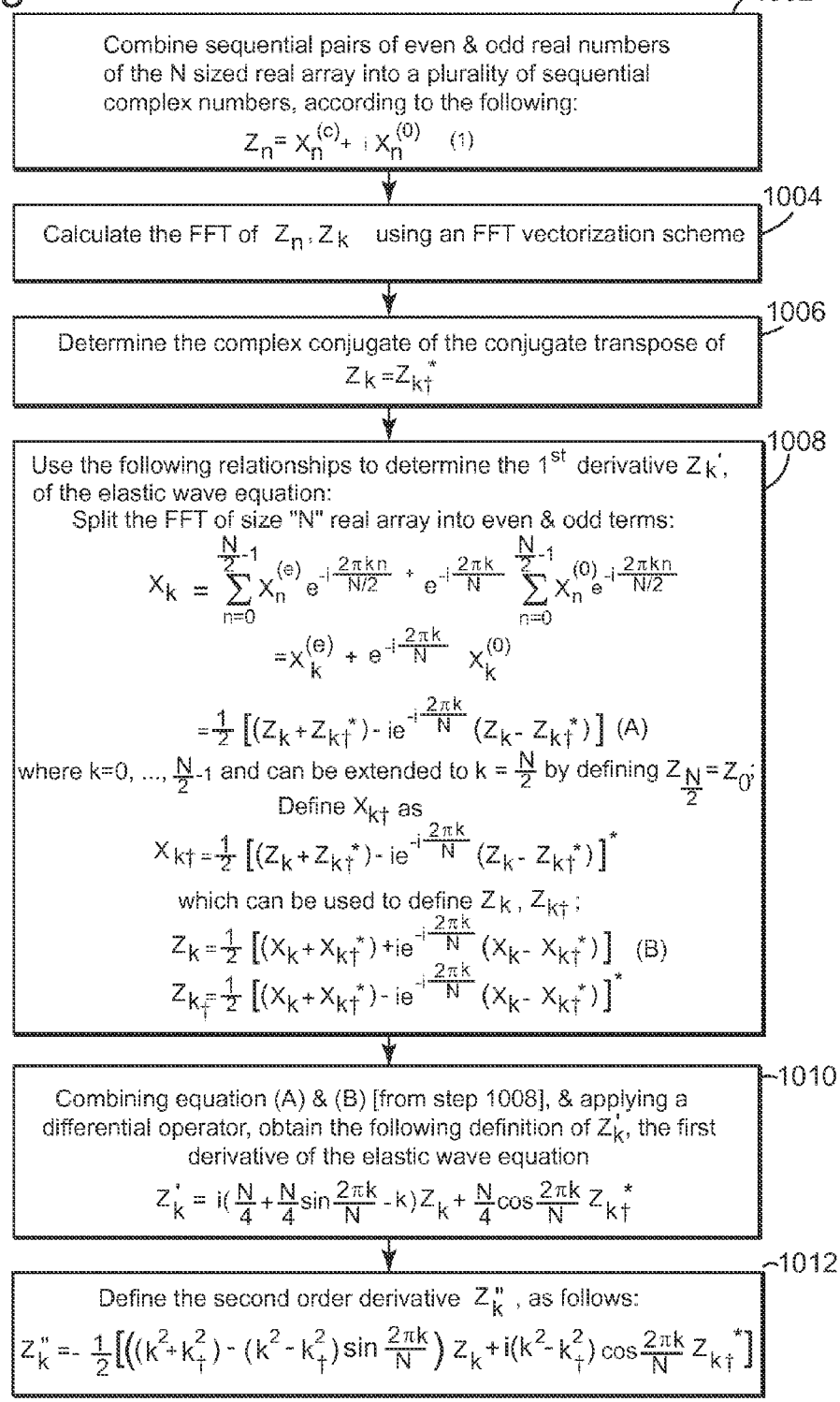
Figure 11:
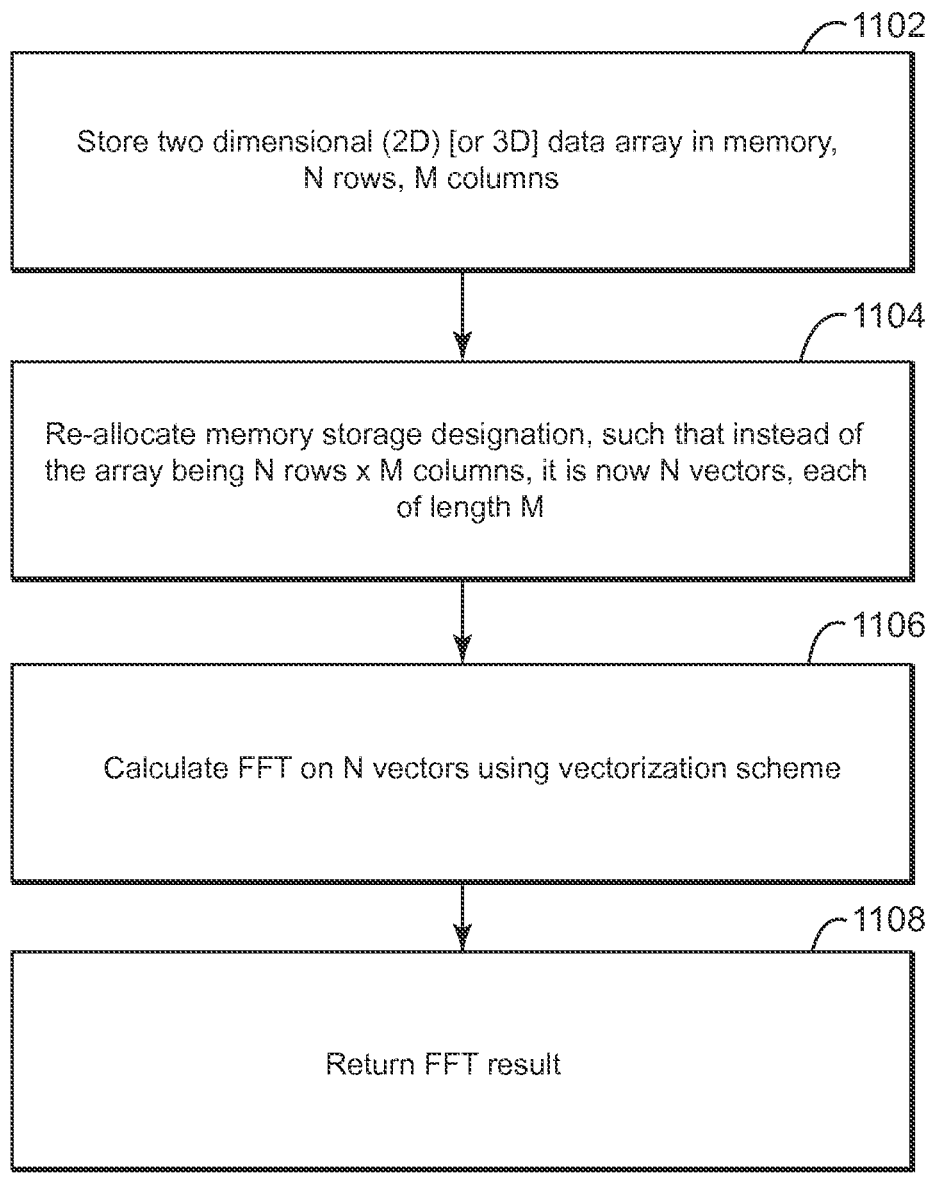

FIG. 8 illustrates the performance advantage of FFTV according to an embodiment over FFTW when the data is plotted as a ratio of performance ratio, that is, the time elapsed for FFTW divided by that of FFTV;

FIG. 9 illustrates a flow chart of a method for visually representing propagation of waves underground in a marine geographical area of interest according to an embodiment;

FIG. 10 illustrates a step of determining a set of first derivatives of the elastic wave equation used in the method of FIG. 9 according to an embodiment;

FIG. 11 illustrates a flow chart of a method for vectorization of a fast Fourier Transform to decrease processing times of received underwater seismic data for use in the method of FIG. 10 according to an embodiment; and FIG. 12 illustrates a seismic data acquisition system suitable for use to implement a method for vectorization of a fast Fourier Transform to increase processing times of received underwater seismic data according to an embodiment.

DETAILED DESCRIPTION

The embodiments are described more fully hereinafter with reference to the accompanying drawings, in which various embodiments are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the embodiments concept to those skilled in the art. The scope of the embodiments are therefore defined by the appended claims. The following embodiments are discussed, for simplicity, with regard to the terminology and structure of a marine and land seismic exploration system using a plurality of sources, receivers and other associated apparatus. However, the embodiments to be discussed next are not limited to these systems but may be applied to other seismic systems that are affected by FFT signal processing constraints.

Reference throughout the specification to "one embodiment" or "an embodiment" means that a particular feature, structure, or characteristic described in connection with an embodiment is included in at least one embodiment of all of the embodiments. Thus, the appearance of the phrases "in one embodiment" on "in an embodiment" in various places throughout the specification is not necessarily referring to the same embodiment. Further, the particular feature, structures, or characteristics may be combined in any suitable manner in one or more embodiments.

Used throughout the specification are several acronyms, the meaning of which are provided as follows: universal serial bus (USB); high speed interchip (HSIC); consumer electronics (CE); personal computer (PC); system-on-chip (SoC); USB transceiver macro-cell interface (UMTI+); UTMI+ low pin count interface (ULPI); physical transceiver (PHY); reverse time migration (RTM); vertical transverse isotropic (VTI); titled transverse isotropic (TTI); tilted orthorhombic (T-ORT); discrete Fourier transform (FFT); fast Fourier transform (FFT); three dimensional (3D); four dimensional (4D); single instruction, multiple data (SIMD); streaming SIMD Extensions (SSE); fast Fourier transform vectorization (FFTV); Fastest Fourier Transform in the West (FFTW); Intel® Math Kernel Library (MKL); GNU Compiler Collection (GCC); geographical areas of interest (GAI); and printed circuit board (PCB).

Numerical simulation of elastic wave propagation is the kernel of the most advanced imaging tools. One example of an advanced imaging tool is referred to as reverse time migration (RTM), and is described in " " (Baysal, E. et al., 1983, "Reverse Time Migration," Geophysics, 48, p. 1514-1524, and McMechan, G. A., 1983, "Migration by Extrapolation of Time-Dependent Boundary Values," Geophysical Prospecting, 31, p. 413-420, the entire contents of both of which are incorporated herein by reference). The RTM application has evolved from isotropic media to vertical transverse isotropic (VTI) media (see, Zhou, H. et al., 2006, "An Anisotropic Acoustic Wave Equation for VTI Media," EAGE, Extended Abstracts, H033-H033, the entire contents of which are incorporated herein by reference), to titled transverse isotropic (TTI) media (Zhang, H. et al., 2011, "A Stable TTI Reverse Time Migration and its Implementation," Geophysics, 76, no. 3, WA3-WA11, and Duveneck, E. et al., 2011, "Stable P-Wave Modeling for Reverse-Time Migration in Tilted TI Media," Geophysics, 76, no. 2, S65-S75, the entire contents of both of which are incorporated herein by reference), and, most recently, to tilted orthorhombic (T-ORT) anisotropic media (Zhang, H. et al., 2011, "Reverse Time Migration in Vertical and Tilted Orthorhombic Media," SEG, Expanded Abstracts, 30, no. 1, p. 185-189, the entire contents of which are incorporated herein by reference). This evolutionary trend shows the increasing numerical requirement of wave propagation with regard to handling a model with more complicated anisotropy. Eventually, the wave propagation on a fully elastic model will be the crucial component for future imaging applications.

We start directly from the elastic wave equation, $$\rho(x)\frac{\partial^2 u_i}{\partial t^2} - \frac{\partial}{\partial x_j}C_{ijkl}\frac{\partial}{\partial x_l}u_k = f_i \qquad (1)$$

where u is the displacement vector, ρ is the density, $C_{ijkl}$ is the stiffness tensor, and f is the force.

For the numerical simulation of Equation (1), when the low order finite-difference scheme is applied on the computation of spatial derivatives, it generally requires that the wavefields are densely sampled. For example, for the fourth order finite-difference scheme, ten grid points are proposed to resolve a given wavelength with a good accuracy (Alford et al., 1974). Higher order finite-difference schemes allow for a sparse grid sampling rate, with increases of numerical cost. Consequently, the pseudo-spectral method was proposed to ensure the accuracy up to Nyquist frequency, the highest spatial frequency (see, Gazdag, J., 1981, "Modeling of the Acoustic Wave Equation with Transform Methods," Geophysics, 46, no. 6, p. 854-859; Kosloff, D. et al., 1982, "Forward Modeling by a Fourier Method," Geophysics, 47, no. 10, p. 1402-1412; and Song, X. et al., 2011, "Fourier Finite-Difference Wave Propagation," Geophysics, 76, no. 5, T123-T129, the entire contents of all of which are incorporated herein by reference), because it uses the FFT to compute the spatial derivatives. In other words, the pseudo-spectral method allows for the sparsest spatial sampling rate, which means it greatly reduces the number of required grid points, consequently saving computer resources, such as memory, disk space, etc., especially in 3D cases. The FFT plays a critical role in the pseudo-spectral method; its efficiency directly affects the computational cost of numerical simulation. As such, the system and method according to an embodiment optimizes the FFT dedicated to 3D elastic wave propagation applications. According to a further embodiment, a vectorization scheme can be used to improve the efficiency of the FFT.

As is known to those of skill in the art, the FFT is a method for computing the discrete Fourier transform (DFT) faster than the DFT, and produces substantially identical results. Let $x_0, \ldots, x_{N-1}$ be complex numbers that represent digital data in the time domain. The purpose of the DFT is to transpose time domain information into a frequency domain representation. The practical use and importance of the DFT, albeit in the form of the FFT, cannot be overstated. Practically all signal processing begins with a determination of the frequency components of the signal following digitization, which truly is ubiquitous. The DFT and its inverse are defined by the formula:

$$X_k = \sum_{n=0}^{N-1} x_n e^{-i\frac{2\pi kn}{N}}, \quad (2)$$

$$x_n = \frac{1}{N}\sum_{k=0}^{N-1} X_k e^{i\frac{2\pi kn}{N}}.$$

In Equation (2) $X_k$ represents the frequency domain representation of $x_n$, which is the digital time domain representation of a signal $x_{(t)}$. Each of the two parts in Equation (2) requires $O(N^2)$ operations. When N can be factorized into N=M×L, a scheme to quickly compute the DFT was proposed by Gauss, as described in Heideman, M. T. et al., 1984, "Gauss and the History of the Fast Fourier Transform," IEEE ASSP Magazine, 1, (4), p. 14-21, the entire contents of which are incorporated herein by reference, and popularized by Cooley, J. W. et al., 1965, in "An Algorithm For the Machine Calculation of Complex Fourier Series," Math. Comput. 19 (90): p. 297-301, doi:10.1090/S0025-5718-1965-0178586-1, the entire contents of which are incorporated herein by reference. Equation (2) can then be rewritten as—

$$X_{Ml_1+k_m} = \sum_{l=0}^{L-1} e^{-i\frac{2\pi k_l l}{L}} e^{-i\frac{2\pi l k_m}{N}} \sum_{m=0}^{M-1} x_{Ml+m} e^{-i\frac{2\pi k_m m}{M}}. \quad (3)$$

Figure 4:
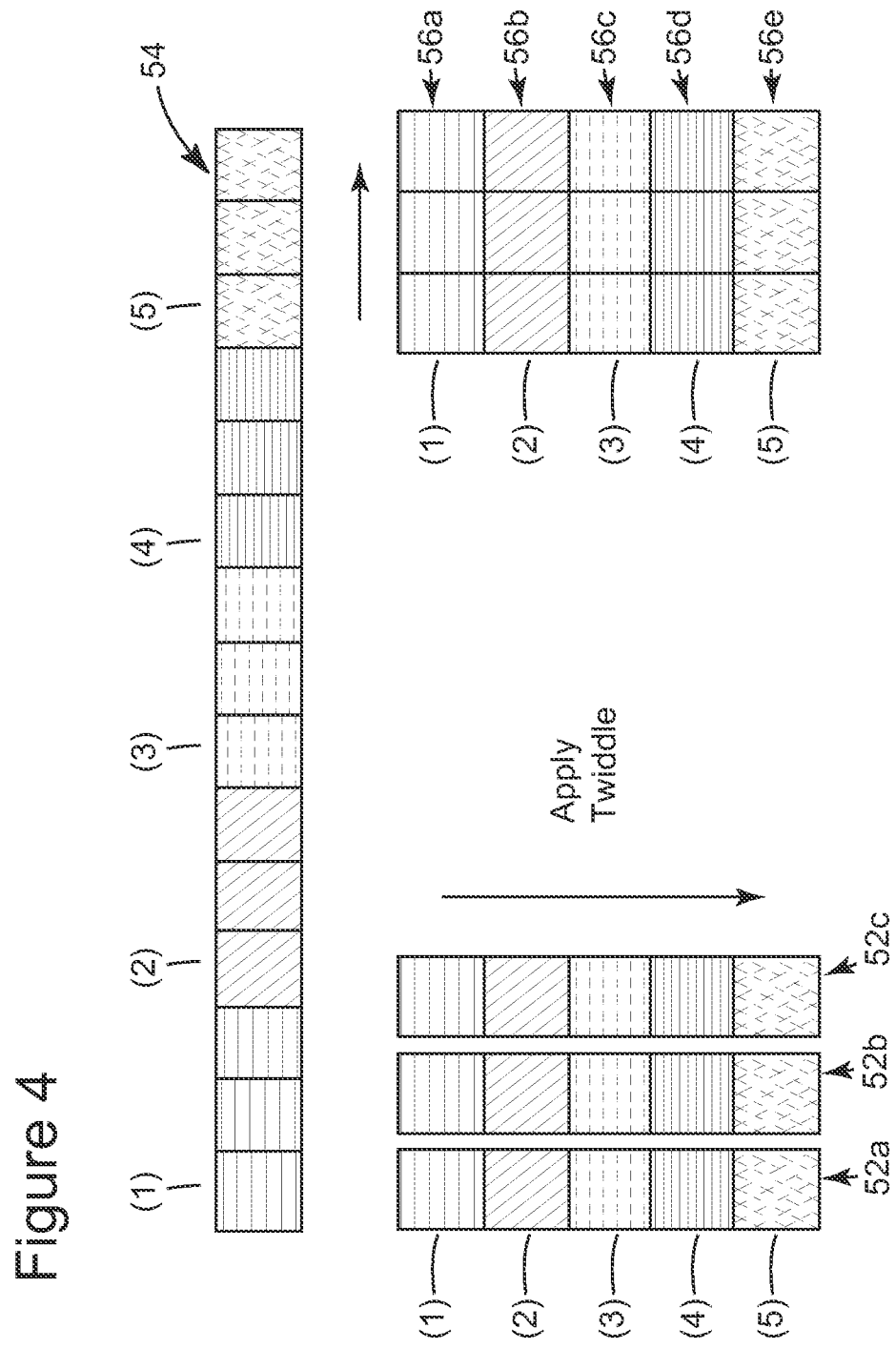
FIG. 4 illustrates a pictorial representation of the factorization of a discrete Fourier transform with size N=15.

Equation (3) implies that the DFT of size N can be realized by L times of size-M DFTs, and M times of size-L DFTs. The $$e^{\frac{-2\pi i l k_m}{N}}$$

term is called twiddle, and this concept is illustrated in FIG. 4. FIG. 4 illustrates a pictorial representation of the factorization of a discrete Fourier transform with size N=15 (i.e., a data segment 54 of length 15; note the numbers (1), (2) and so on in data segment 54 are there for reference purposes only, to show how the data can be configured for the DFT of Equation (3)). In FIG. 4, the data is re-arranged into three groups, or columns, each of length 5. A first DFT is performed on the first column, resulting in DFT 52a, then on the second or middle column, resulting in DFT 52b, and then on the third column, resulting in DFT 52c. The twiddle is then multiplied against the first three DFTs, 52a-c. DFTs 52a-c are a set of 3 DFTs each with size 5 (note the five elements (1), (2), (3), (4), and (5) in each of the 3 separate DFTs 52a,b,c). After the multiplication, the data is arranged as shown in the right hand portion, and now five DFT's are performed, each of size three. The result of this last DFT multiplication are DFTs 56a-e, each of size 3 (the same elements (1)-(5) are now separated into five different DFTs, and nothing has been lost).

In the simple case that N is a power-of-two number, the algorithm yields $O(N \log_2 N)$ operations. Despite the twiddle factor, the numerical computation of Equation (3) is very close to a two dimensional FFT.

According to an embodiment, FIG. 4 also shows an interesting structure of data storage as well. For a 2D FFT with a size of 3×5, the 5 FFTs of step 3 are applied to the fastest dimension. "Fastest dimension" in this case, meaning that dimension which has the least amount of data. For example, in a 3×5 array (as those of skill in the art can appreciate, rarely, if ever, would the case be that the data for a FFT constitute only a 3×5 data array; normally, such data is the order of kilobytes, megabytes, and even perhaps gigabytes; the 3×5 array is simply a convenient size to work with and show in the accompanying figures), the 3 refers to the width of the array of data—3 columns, and the 5 refers to the depth or height, the 5 rows. Each single FFT can be applied locally, with input data continuously stored in memory. A data structure of this type enhances a high performance numerical scheme because it is scalable for multi-thread technology and a simple open multi-processing (MP) code will significantly improve the efficiency. As those of skill in the art can appreciate, multi-threading is a widespread programming and execution model that allows multiple threads to exist within the context of a single process. While the multiple threads share the process' resources, they are able to execute independently. It is most useful, however, when applied to multi-processing technology, because true multi-threading can occur wherein multiple different steps can occur at the exact same time. Then, a single process can be truly enabled to perform parallel execution on a multiprocessing system. According to a further embodiment, the continuous data access will ensure the usage of cache.

However, the first step that is shown in FIG. 4 represents the "slow dimension" of data storage. That is, for each single FFT the data is not continuously stored in memory and so it takes a significant amount of time to retrieve the data and process it as shown in FIG. 4. As a result, data access latency increases, and performance decreases. One solution to solve this problem is to transpose the data array, apply the FFT as in step 3, then transpose the array back. An additional cost occurs when transposing of the array, but because this can be done prior to FFT computation, it does not slow the computation down itself.

According to an embodiment, the two aforementioned additional transpositions of the data array are not necessary. Instead of the conventional FFT code, which can be applied on floating-point numbers (single or double precision), an FFT code has been developed that can be applied on vectors (series of float or double numbers).

Figure 5:
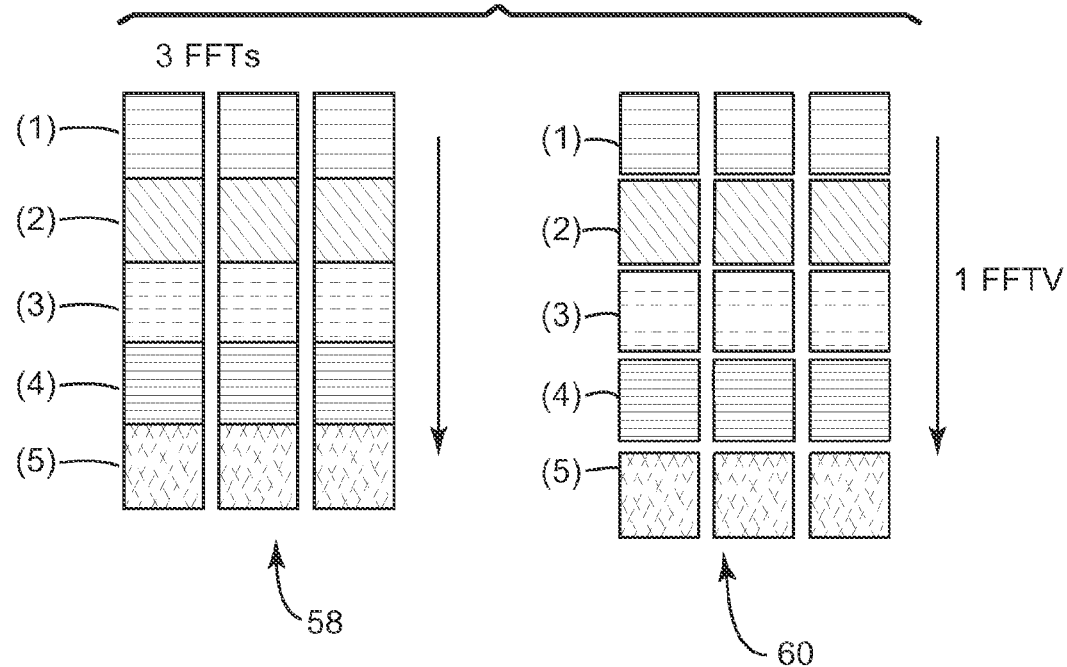
FIG. 5 illustrates a pictorial representation of vectorization of a two dimensional fast Fourier transform for slow dimension of a discrete Fourier transform with size N=15 according to an embodiment.

FIG. 5 illustrates a pictorial representation of vectorization of a two dimensional fast Fourier transform for slow dimension of a discrete Fourier transform with size N=15 according to an preferred embodiment. Element 58 represents 3 FFTs applied to the slower dimension without data transposing.

Element 60, however, in FIG. 5, illustrates the FFT applied on vectors following restricting of the data according to an embodiment. Without transposing the data array, the 3 FFTs applied on the data stored and distributed on non-continuous memory (left; element 58) are replaced by one FFT applied on vector as shown on the right, or element 60 of FIG. 5. When represented as shown in FIG. 5, the data of the vectors are continuously stored in memory. The method according to an embodiment makes use of vector processing to determine the FFT in accordance with the "re-defined" data structure in the form of a vector as shown. According to a further embodiment, the FFT operations amongst vectors can be readily vectorized using streaming SIMD Extensions (SSE) or a similar vectorization scheme. According to a further embodiment, the SSE technique is also applied for the operations of the multiplication of the twiddle factor. Furthermore, the calculation of triangular functions is reduced by a factor M, which significantly saves computational cost as well. As is readily apparent to those of skill in the art, no additional memory is required in the implementation according to an embodiment because neither the data nor the way its stored has changed in any way; according to a preferred embodiment, what has changed is the way in which the data is processed in the calculation of the FFT. Additionally, if the FFT size can be factorized with more than 2 primes, the implementation can be recursive and implemented without any loss of SSE performance.

Most functional computers for high performance computation have many cores ("cores" being another word for processors or microprocessors). The scalability of the approach according to an embodiment on machines with multiple cores contributes to the success of this approach. According to a further embodiment, the fast Fourier transform vectorization (FFTV) threading scheme has each core take charge of one data segment and thus does not require any change to the structure of the code.

In the case of 3D data, assume that the data is stored from fastest to slowest direction, z, x and y and of size $N_z$, $N_x$ and $N_y$ respectively. For a FFT along the slowest dimension y, the vector length is $N_z \times N_x$ and can easily be threaded, though it is likely to be cache-unfriendly when the sizes are large and special handling might be needed. For the second-fastest dimension x, vectorization is along dimension z, and the threading scheme can be implemented along y. This direction x is the most optimized direction for FFTV, because, even when $N_z \times N_x$ is large and misfits the cache, the factorization process is cache friendly for each smaller step. This is very different than conventional FFT schemes for which the dimension z is the most optimized direction.

As for the fastest dimension z, if $N_z$ is not too large, with $N'_x$ a part of $N_x$, the data with size of $N_z \times N'_x$ could fit into the cache, 2D transposing of such size is an easy and relatively efficient way to optimize the vectorization. When $N_x$ becomes very large, factorizing the 1D FFT into a 2D FFT and then applying the FFTV algorithm is superior.

Attention is again directed to the problem of the calculation of the spatial derivatives of the elastic wave equation (Equation (1)), the results of which can be used especially for modeling marine underground geographical areas of interest (GAI). According to a further embodiment, the system and method described herein can be used to calculate spatial derivatives of 3D elastic wave propagations, the solutions of which have been shown to be problematic using other techniques. According to an embodiment, data generated from elastic wavefields can be stored with single precision floating numbers, which are not complex values. The FFT output of real values follows the symmetry of $x_k = X_{N-k}^*$, where the superscript * denotes the conjugate of the complex. Without rewriting the complex FFT code, there are two methods to take advantage of the above described symmetry and nearly double the efficiency of the real-to-complex computation of the FFT and vice-versa. In the first method, two real arrays of size N are combined with one complex array of size N and the FFT of size N is performed once. Alternatively, in the second method, it is possible to convert one real array of size N to a complex array of size N/2 and then perform the FFT of size N/2. According to an embodiment, it is presumed that N is an even number as it is possible to pad odd numbers to create even numbers with substantially no additional cost on FFT.

According to an embodiment, the first method of taking advantage of the above described symmetry regarding real values to nearly double the efficiency of the real-to-complex computation of the FFT and vice-versa is trivial to implement, except for the need to consider magnitude mismatch between two arrays that are combined together. As such, those of ordinary skill in the art can appreciate that discussion of the first method has been omitted for the dual purposes of clarity and brevity.

The second manner of taking advantage of the above described symmetry regarding real values to nearly double the efficiency of the real-to-complex computation of the FFT and vice-versa begins with the combination of each pair of even and odd real numbers into one complex number:

$$z_n = x_{2n} + i x_{2n+1} = x_n^{(e)} + i x_n^{(o)},$$

in which n=0, . . . , $$\frac{N}{2} - 1. \tag{4}$$

Then, $$X_k^{(e)} = \frac{1}{2}(Z_k + Z_{k_\dagger}^*) \text{ and } X_k^{(o)} = \frac{-i}{2}(Z_k - Z_{k_\dagger}^*), \tag{5}$$

where k=0, . . . , $$\frac{N}{2} - 1, K_\dagger = \frac{N}{2} - k$$

and $Z_k$ is the FFT of $z_n$.

According to an embodiment, the FFT is split into a size-N real array of even and odd terms:

$$X_k = \sum_{n=0}^{\frac{N}{2}-1} x_n^{(e)} e^{-i\frac{2\pi k n}{N/2}} + e^{-i\frac{2\pi k}{N}} \sum_{n=0}^{\frac{N}{2}-1} x_n^{(o)} e^{-i\frac{2\pi k n}{N/2}} = \tag{6}$$

$$X_k^{(e)} + e^{-i\frac{2\pi k}{N}} X_k^{(o)} = \frac{1}{2}\left[(Z_k + Z_{k_\dagger}^*) - i e^{-i\frac{2\pi k}{N}}(Z_k - Z_{k_\dagger}^*)\right],$$

where k=0, . . .

$$\frac{N}{2} - 1$$

and can be extended to $$k = \frac{N}{2}$$

by defining $Z_{N/2}=Z_0$.

According to a further embodiment, and after some additional processing, the following is obtained:

$$X_{k_+} = \frac{1}{2}\left[(Z_k + Z_{k_+}^*) + ie^{-i\frac{2\pi k}{N}}(Z_k - Z_{k_+}^*)\right]^*. \quad (7)$$

Equations (6) and (7) are complex-to-real transformations in the frequency domain; the reverse is the real-to-complex transformations:

$$Z_k = \frac{1}{2}\left[(X_k + X_{k_+}^*) + ie^{i\frac{2\pi k}{N}}(X_k - X_{k_+}^*)\right], \text{ and} \quad (8)$$

$$Z_{k_+} = \frac{1}{2}\left[(X_k + X_{k_+}^*) - ie^{i\frac{2\pi k}{N}}(X_k - X_{k_+}^*)\right]^*. \quad (9)$$

Any frequency-based operations, including filtering and derivatives, can be applied to $X_k$ and $X_{k_+}$ and then converted back to $Z_k$ and $Z_{k_+}$ using Equations (8) and (9).

Equations (8) and (9) can be further manipulated to obtain derivatives by including a differential operator:

$$Z'_k = i\left(\frac{N}{4} + \frac{N}{4}\sin\frac{2\pi k}{N} - k\right)Z_k + \frac{N}{4}\cos\frac{2\pi k}{N}Z_{k_+}^*. \quad (10)$$

A similar result can be obtained for the second order derivative:

$$Z''_k = -\frac{1}{2}\left[\left((k^2 + k_+^2) - (k^2 - k_+^2)\sin\frac{2\pi k}{N}\right)Z_k + i(k^2 - k_+^2)\cos\frac{2\pi k}{N}Z_{k_+}^*\right]. \quad (11)$$

According to further embodiments, simulations using the above described process illustrates that the combination of complex-to-real and real-to-complex transformations contributes to a noticeable performance improvement, as discussed in greater detail below.

Figure 6:
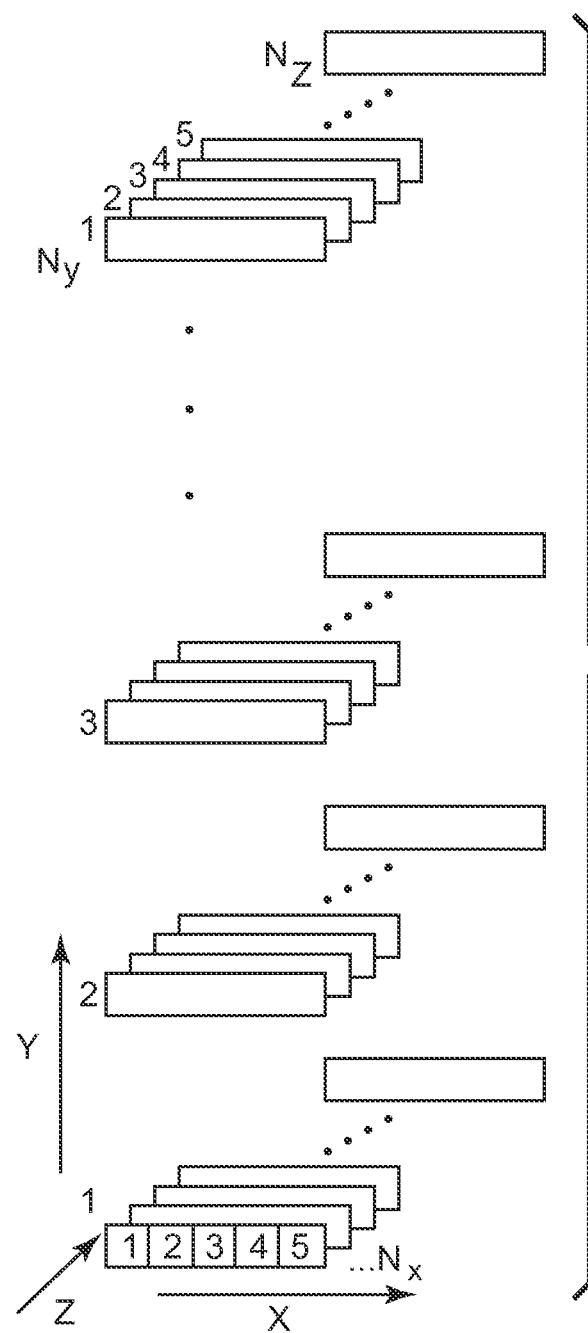
FIG. 6 illustrates a three dimensional data array of size $N_x \times N_y \times N_z$ that can store data upon which a three dimensional fast Fourier Transform can be calculated to assist in plotting elastic wave propagation in marine seismic operations according to an embodiment.

The benchmark for the FFTV process for calculating the first derivative according to an embodiment includes comparing its processing speed and capability with the Fastest Fourier Transform in the West (FFTW) library (Frigo, Matteo et al., 2005, "The Design and Implementation of FFTW3, Proceedings of the IEEE 93 (2)," p. 216-231, the entire contents of which are incorporated herein by reference) and the Intel® Math Kernel Library (MKL). In performing the benchmark evaluations, the machines use Intel Xeon® X5650 (2.67 GHz) processors with 12 cores. The FFTW library (version 3.1.1) was compiled by a GNU Compiler Collection (GCC), version 4.6.2, with the flags "—O3-fomit-frame-pointer-mtune=native-malign-double-fstrict-aliasing-fno-schedule-insns-ffast-math". According to a further embodiment, self-generated threading was provided using OpenMP® when benchmarking FFTW. It is also known to those of skill in the art that FFTW is known to be noticeably slower for certain numbers, and therefore the data was padded to a larger but faster number when possible in the benchmarking For ease of comparison, the testing on the MKL (version 10.2 update 2) was performed by using its own FFTW wrapper interface, and the same OpenMP threading was used. For a 3D data array, illustrated in FIG. 6, the data was stored from the fastest to the slowest direction, z, x and y. For simplicity, the same size data for each z, x and y, was used, such that the data is of size N×N×N. By benchmarking FFTW for different Ns for 1D data, optimal performance was achieved with the radix combination of 2, 3, and 5. The FFTV implementation according to an exemplary embodiment also used the radix combination of 4, 6, and 8 in additional to 2, 3, and 5. Furthermore, in order to provide a well-defined base benchmark, FFTW's basic 1D real-to-complex and complex-to-real DFTs were used and optimized for calculating $$\frac{\partial}{\partial x}, \frac{\partial}{\partial y} \text{ and } \frac{\partial}{\partial z}.$$

Figure 7:
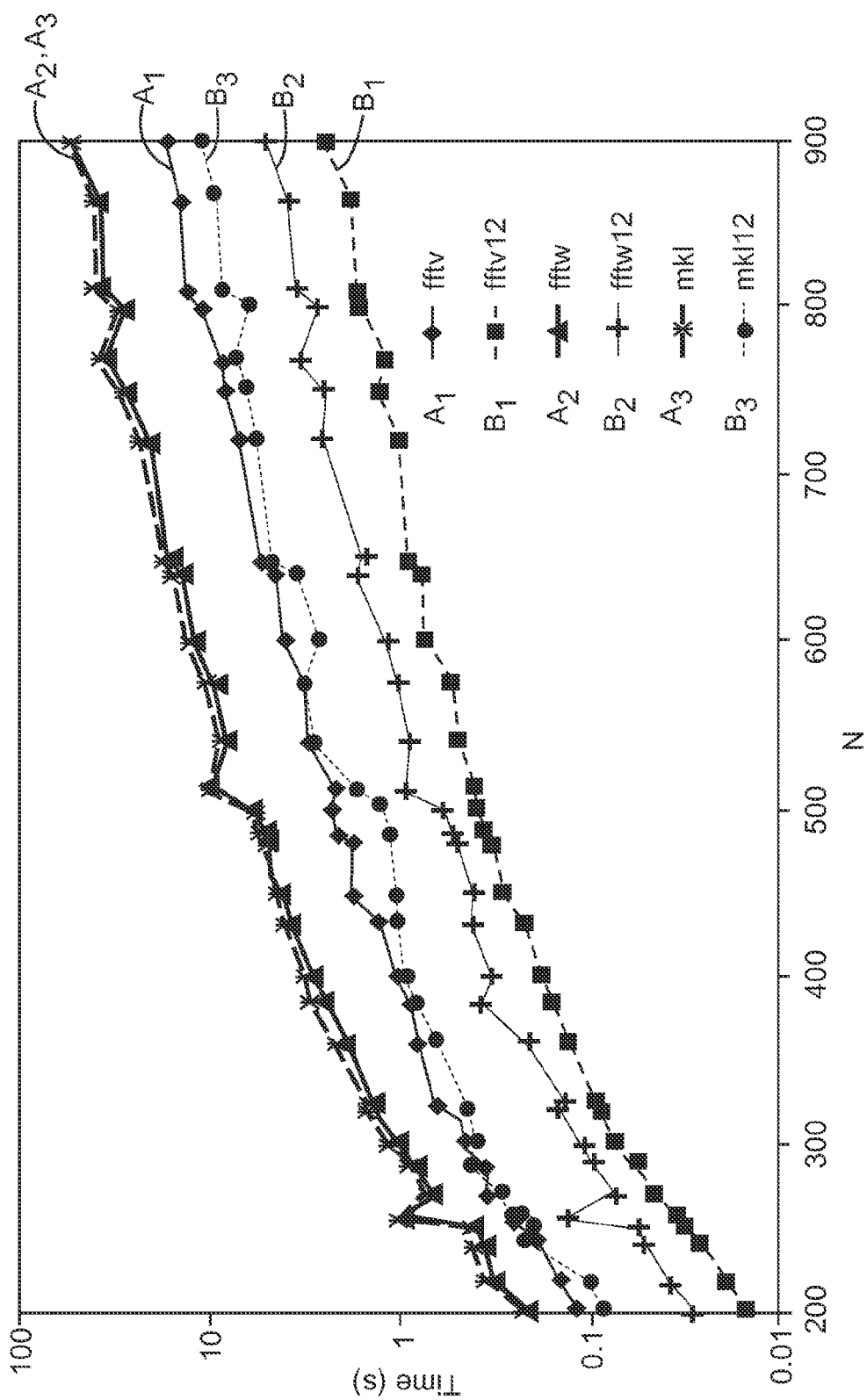
FIG. 7 plots the total elapsed time to perform the operations $$\frac{\partial}{\partial x}, \frac{\partial}{\partial y}, \text{ and } \frac{\partial}{\partial z}$$

FIG. 7 plots the total elapsed time to perform the operations $$\frac{\partial}{\partial x}, \frac{\partial}{\partial y}, \text{ and } \frac{\partial}{\partial z}$$

against N according to an embodiment. The legend, mkl, fftw, fftv, mkl12, fftw12 and fftv12, denotes the time of MKL with single thread, FFTW with single thread, FFTV with single thread, MKL with 12 threads, FFTW with 12 threads, and FFTV with 12 threads, respectively. It can be clearly seen by those of skill in the art that the implementation of FFTV according to embodiments is superior over both MKL and FFTW for such operations, and scales well with multi-core processors. That is, FFTV with a single thread outperformed both MKL and FFTW with single threads, and FFTV with 12 threads outperformed both MKL and FFTW with 12 threads. It is further apparent that FFTV, in both the single and 12 thread scenarios well out-performed the known methods of performing the derivatives described above. It can further be noted that the process of FFTV with a single thread performed almost as well as MKL with 12 threads in certain cases, and in several instances as well or even better. It is further noted by those of skill in the art that MKL's FFT single-threading routines do not scale well with the OpenMP threading, but do scale similarly to FFTW when using MKL's own threaded routines. Thus, comparisons need only be made between FFTV according to an embodiment, and FFTW.

FIG. 8 illustrates the performance advantage of FFTV according to an embodiment over FFTW when the data is plotted as a ratio of performance ratio, that is, the time elapsed for FFTW divided by that of FFTV. In FIG. 8, the legend indicates ratio_x—the ratio for $$\frac{\partial}{\partial x};$$

ratio_y—the ratio for $$\frac{\partial}{\partial y};$$

ratio_z—the ratio for $\frac{\partial}{\partial z}$;

and ratio—represents the overall ration. The performance advantage of FFTV according to an embodiment over FFTW is clearly shown in FIG. 8. The overall performance of FFTV is over 2 times faster than FFTW and trends towards 3 times faster for larger numbers. The ratio along the slowest dimension y (line D in FIG. 8) indicates performance enhancement by a factor of 8 along this direction for N=900 mostly due to the fact that FFTV is more cache-friendly. Along dimension z, which is FFTV's second-fastest dimension and FFTW's fastest dimension (and thus most cache friendly), the performance ratio is roughly 1.0 (lines A and B). According to a further embodiment, it is possible to make the vectorization natural along z direction by converting 1D FFT to 2D FFT with additional coding, such that the ratio z may be improved to ~1.4, which was estimated by $\sqrt{ratio\_x \times ratio\_z}$ in FIG. 8).

According to an embodiment, a numerical scheme to vectorize the FFT algorithm has been presented herein. The developed FFT code can be applied on vectors instead of numbers and accelerates a 1D FFT when the input data has a large number of points. When applied to multi-dimensional data, i.e., a 2D or 3D FFT, it is even more efficient with the slower data storage dimensions than the fastest one, and the FFTV has in-place memory usage.

According to an embodiment, the dedicated SSE vectorization of the FFT allows for significant efficiency improvement, and the method can be easily adapted to other vectorization techniques that are similar to SSE. The FFTV scheme according to an embodiment is easily parallelized on machines with multiple cores. The multi-thread coding is substantially straight-forward, and the computational efficiency is highly scalable because, in most of cases, this scheme is cache-friendly without much additional delicate tuning.

Figure 1:
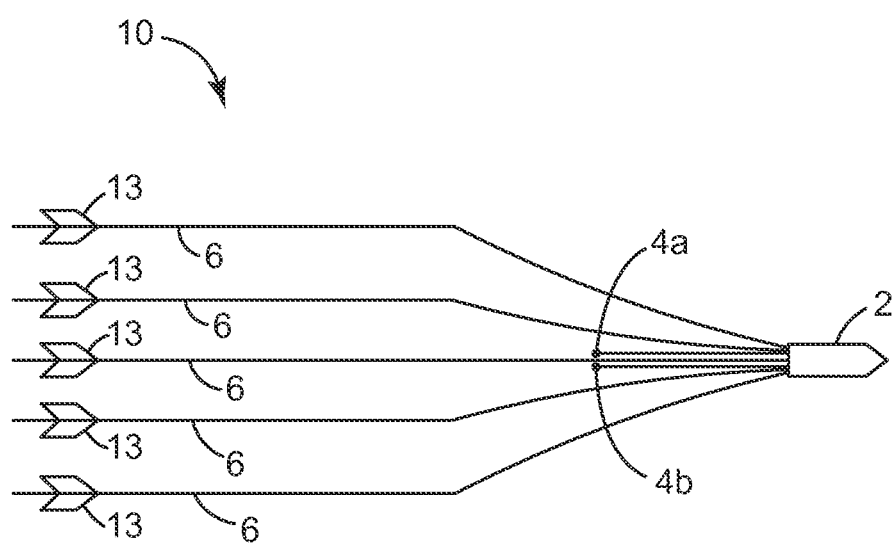
FIG. 1 illustrates a top view of a data acquisition system for use in an underwater seismic gathering process.
Figure 2:
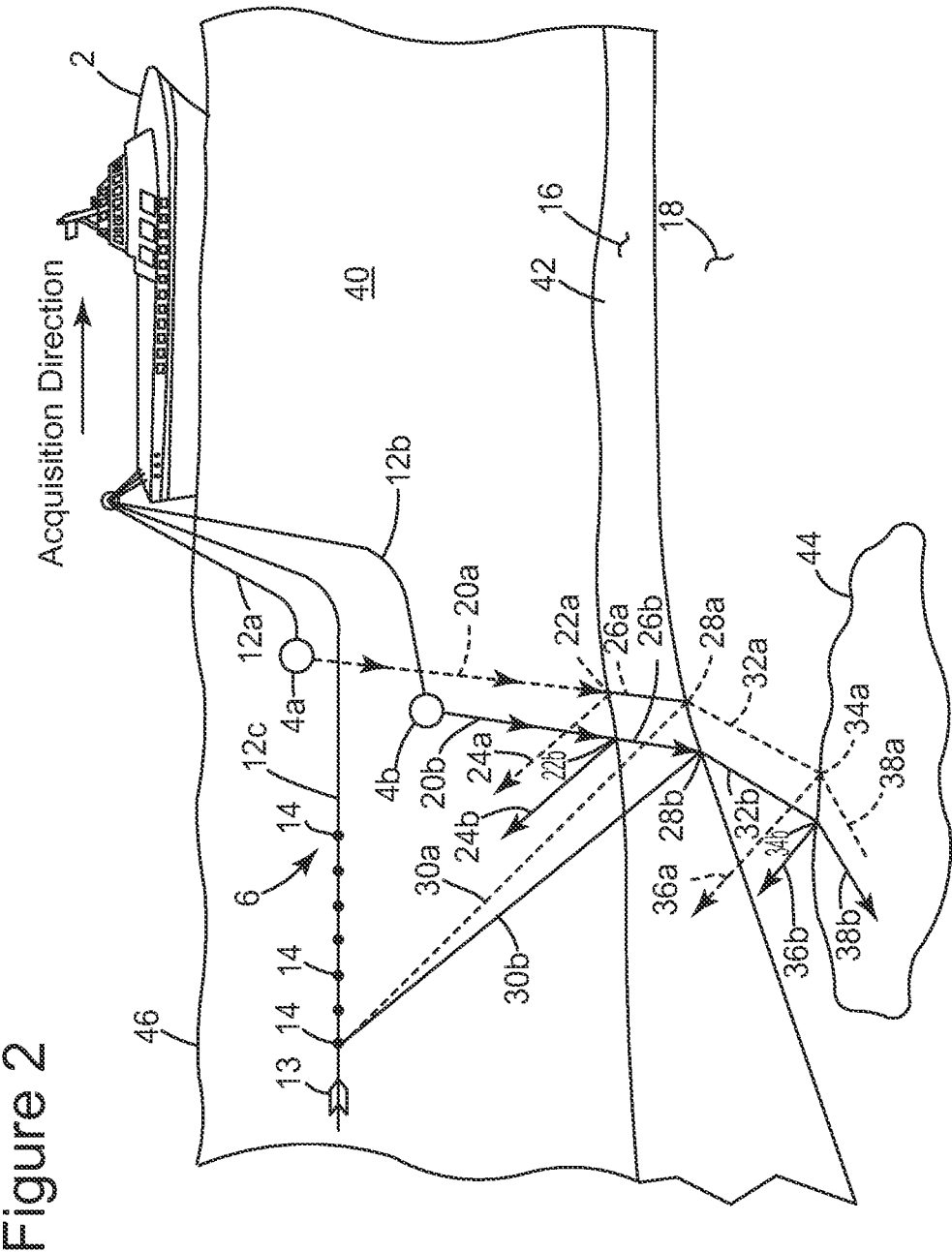
FIGS. 2 and 3 illustrate a side view of the data acquisition system of FIG. 1 and pictorially represent transmitted, reflected and refracted sound waves.

For the numerical simulation of 3D elastic wave propagation, especially useful in the presentation of underwater geographical features based on detected reflected and refracted sound waves, when the pseudo-spectral algorithm is applied, the major computational cost is in the calculation of the first derivatives. For the wavefield stored in memory with floating numbers (i.e., following the collection of wave data as discussed in greater detail above in regard to FIGS. 1 and 2), the derivative calculation can employ the real-to-complex FFT transform and its inverse according to an embodiment. Additional benefits of the FFTV according to an embodiment for underwater seismic analysis, though not limited thereto, are that it does not require repetitive calculations of the twiddle factors or necessitating storing of them in memory. The method according to an embodiment also does not require the swap of data in memory and can combine the real-to-complex and complex-to-real operations in a single step. According to an embodiment, all of the aforementioned factors contribute to the resulting improvement of efficiency by a factor of 2-3 as shown in FIG. 8.

Figure 3:
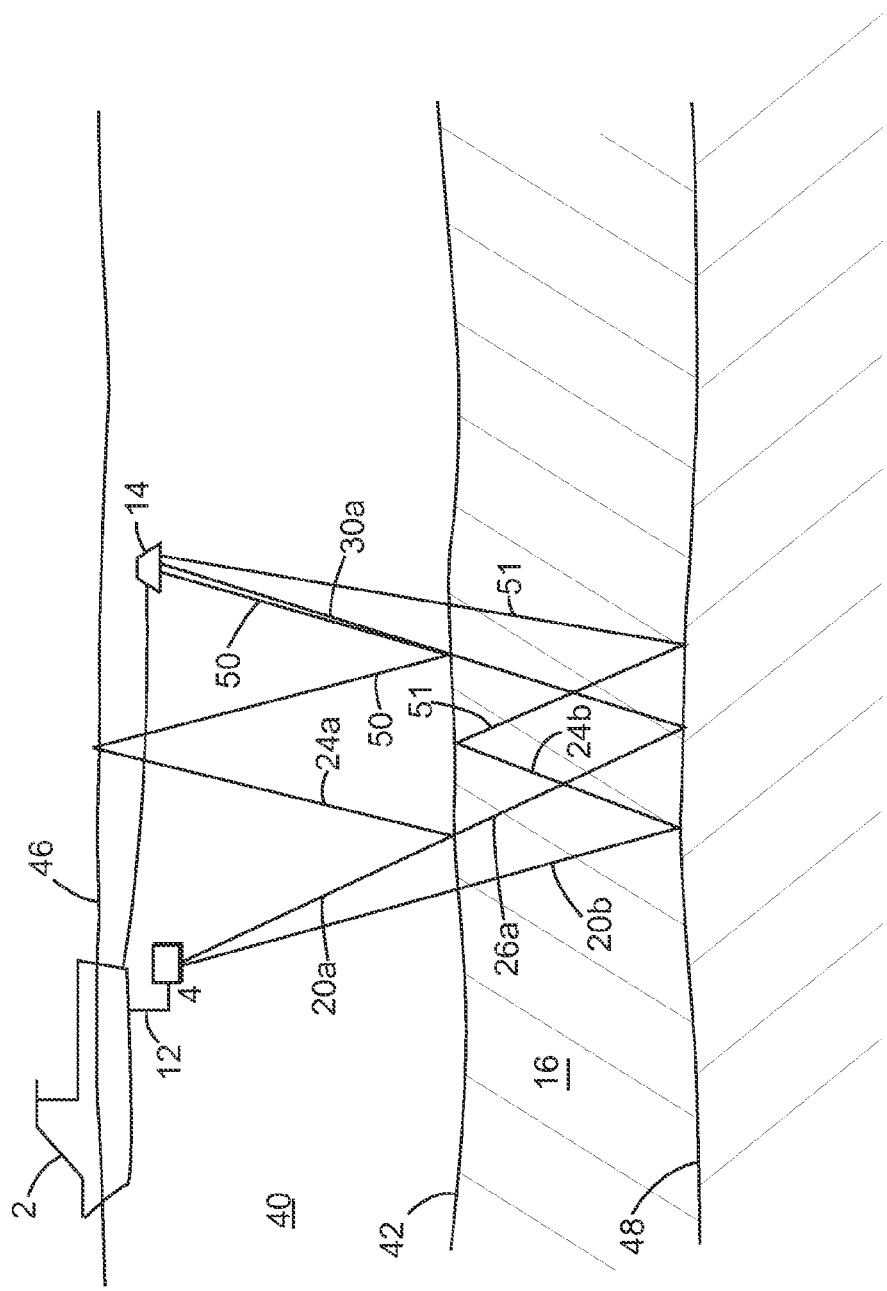

FIG. 9 illustrates a flow chart of method 900 for visually representing propagation of waves underground in a marine geographical area of interest according to an embodiment. Method 900 begins with step 902, wherein marine seismic sound waves are transmitted by a plurality of transmitters typically under, but could be on, the surface of the ocean. The waves are directed towards the ocean floor, as shown and discussed in reference to FIGS. 1-3. In step 904, the signals are refracted and reflected back to receivers. In step 906, the received signals are converted into digital electronic form. The converted signals are stored and represent the wavefields, which, following processing described above and below, represent the underground geographical features of the geographical area of interest. The data is stored as single precision floating numbers in an array of size N. The storing occurs in memory of data acquisition system 200, described in greater detail below.

Following step 906, in step 908, the N sixed real array of data is converted in a complex array of size N/2. In step 910, the complex array of data, of size N/2, is processed to determine a first derivative of the elastic wave equation (Equation (1)) using Equation (10). In step 912, method 900 uses the results of the first derivative determination of step 910 to simulate propagation of the wavefields underground in the marine environment such that underground geographical features in the geographical area of interest can be visually presented, or displayed, either on board ship 2, using data acquisition system 200, or at another place or location.

FIG. 10 illustrates a flow chart of the method of step 910 for determining a set of first derivatives of the elastic wave equation (Equation (1)) used in the method of FIG. 9 according to an embodiment. The method of FIG. 10 is labeled method 1000 and begins with step 1002, wherein sequential pairs of even and odd real numbers of the N-sized real array are combined to form a plurality of sequential complex numbers according to Equation (4), as described in greater detail above. In step 1004, the FFT of $Z_n$ is determined, $Z_k$, using an FFT vectorization scheme, both described above, and also below in regard to method 1100 in regard to FIG. 11. In step 1006, method 1000 determines the complex conjugate of the conjugate transpose of $Z_k$, written as $Z_{k'}$*. Step 1008 of method 1000 implements a series of mathematical relationships to define the first derivative of the elastic wave equation in terms of $Z_k$ and $Z_{k'}$*. Since this has been discussed in greater detail above, and illustrated in FIG. 10, such that one of ordinary skill in the art can understand the relationships and mathematical processes, a discussion of the same shall not be repeated here for the dual purposes of clarity and brevity. In step 1010 of method 1000, equations (A) and (B), as defined in step 1008, are combined with a differential operator to obtain the first derivative expression of $Z_k'$, the first derivative of the elastic wave equation (Equation (1)), which is dependent upon Zk and $Z_{k'}$*. Since the latter two expressions have been previously calculated (see steps 1004 and 1006 of method 1000), the determination of the first derivative of the elastic wave equation can be readily computed, and used to visually display the wave propagation of refracted and reflected sound waves in the geographical area of interest, as further discussed above and below. Method 1000 then proceeds to step 1012, wherein the second derivative of Zk can also be determined.

FIG. 11 illustrates a flow chart of method 1100 for vectorization of a fast Fourier Transform to decrease processing times of received underwater seismic data for use in the method of FIG. 10 (and ultimately method 900 of FIG. 9), according to an embodiment. The vectorization process, described in greater detail above, provides for the increased processing of FFTs according to an embodiment, as discussed in reference to FIGS. 7 and 8, where specific test results were quantified to show the increase in processing time using multi-core machines to perform the vectorization. Method 1100 is described in regard to a two dimensional array, though, as discussed above, the process is readily implemented on a 3D set of data, and would show greater increases in FFT calculation times because of the increased complexity of known techniques. Method 1100 begins with step 1102, wherein a 2D array of N rows by M columns is stored in memory. In step 1104, the data stored in terms of rows and column is re-designated in terms of vectors; it is important to recognize that the actual data storage does not in any manner change, but that what occurs is the data is now recognized as being comprised of an array of vectors; so, that an N×M array of N rows and M columns is not seen as a set of N vectors, each of length M. In step 1106, a vectorization FFT calculation scheme is implemented on the array of vectors to calculate the FFT. In step 1108, the FFT results are returned or used by whatever process or method called for the use of determination of the FFT using FFT vectorization. According to a further embodiment, the FFT vectorization scheme that is used can be a streaming SIMD extension (SSE). According to a further embodiment, the SSE is also applied for operations of the multiplication of the twiddle FIG. 12 illustrates seismic data acquisition system (system) 200 suitable for use to implement a method for visually representing propagation of waves underground in a marine geographical area of interest, wherein vectorization of a fast Fourier Transform to decrease processing times of received underwater seismic data occurs according to an embodiment. System 200 includes, among other items, server 201, source/receiver interface 202, internal data/communications bus (bus) 204, processor(s) 208 (those of ordinary skill in the art can appreciate that in modern server systems, parallel processing is becoming increasingly prevalent, and whereas a single processor would have been used in the past to implement many or at least several functions, it is more common currently to have a single dedicated processor for certain functions (e.g., digital signal processors) and therefore could be several processors, acting in serial and/or parallel, as required by the specific application), universal serial bus (USB) port 210, compact disk (CD)/digital video disk (DVD) read/write (R/W) drive 212, floppy diskette drive 214 (though less used currently, many servers still include this device), and data storage unit 232. Data storage unit 232 itself can comprise hard disk drive (HDD) 216 (these can include conventional magnetic storage media, but, as is becoming increasingly more prevalent, can include flash drive-type mass storage devices 224, among other types), ROM device(s) 218 (these can include electrically erasable (EE) programmable ROM (EEPROM) devices, ultra-violet erasable PROM devices (UVPROMs), among other types), and random access memory (RAM) devices 220. Usable with USB port 210 is flash drive device 224, and usable with CD/DVD R/W device 212 are CD/DVD disks 234 (which can be both read and write-able). Usable with diskette drive device 214 are floppy diskettes 237. Each of the memory storage devices, or the memory storage media (216, 218, 220, 224, 234, and 237, among other types), can contain parts or components, or in its entirety, executable software programming code (software) 236 that can implement part or all of the portions of the method described herein. Further, processor 208 itself can contain one or different types of memory storage devices (most probably, but not in a limiting manner, RAM memory storage media 220) that can store all or some of the components of software 236.

In addition to the above described components, system 200 also comprises user console 234, which can include keyboard 228, display 226, and mouse 230. All of these components are known to those of ordinary skill in the art, and this description includes all known and future variants of these types of devices. Display 226 can be any type of known display or presentation screen, such as liquid crystal displays (LCDs), light emitting diode displays (LEDs), plasma displays, cathode ray tubes (CRTs), among others. User console 235 can include one or more user interface mechanisms such as a mouse, keyboard, microphone, touch pad, touch screen, voice-recognition system, among other inter-active intercommunicative devices.

User console 234, and its components if separately provided, interface with server 201 via server input/output (I/O) interface 222, which can be an RS232, Ethernet, USB or other type of communications port, or can include all or some of these, and further includes any other type of communications means, presently known or further developed. System 200 can further include communications satellite/global positioning system (GPS) transceiver device 238, to which is electrically connected at least one antenna 240 (according to an embodiment, there would be at least one GPS receive-only antenna, and at least one separate satellite bi-directional communications antenna). System 200 can access internet 242, either through a hard wired connection, via I/O interface 222 directly, or wirelessly via antenna 240, and transceiver 238.

Server 201 can be coupled to other computing devices, such as those that operate or control the equipment of ship 2, via one or more networks. Server 201 may be part of a larger network configuration as in a global area network (GAN) (e.g., internet 242), which ultimately allows connection to various landlines.

According to a further embodiment, system 200, being ostensibly designed for use in seismic exploration, will interface with one or more sources 4*a,b* and one or more receivers 14. These, as previously described, are attached to streamers 6*a,b*, to which are also attached birds 13*a,b* that are useful to maintain positioning. As further previously discussed, sources 4 and receivers 14 can communicate with server 201 either through an electrical cable that is part of streamer 6, or via a wireless system that can communicate via antenna 240 and transceiver 238 (collectively described as communications conduit 246).

According to further embodiments, user console 235 provides a means for personnel to enter commands and configuration into system 200 (e.g., via a keyboard, buttons, switches, touch screen and/or joy stick). Display device 226 can be used to show: streamer 6 position; visual representations of acquired data; source 4 and receiver 14 status information; survey information; and other information important to the seismic data acquisition process. Source and receiver interface unit 202 can receive the hydrophone seismic data from receiver 14 though streamer communication conduit 248 (discussed above) that can be part of streamer 6, as well as streamer 6 position information from birds 13; the link is bi-directional so that commands can also be sent to birds 13 to maintain proper streamer positioning. Source and receiver interface unit 202 can also communicate bi-directionally with sources 4 through the streamer communication conduit 248 that can be part of streamer 6. Excitation signals, control signals, output signals and status information related to source 4 can be exchanged by streamer communication conduit 248 between system 200 and source 4.

Bus 204 allows a data pathway for items such as: the transfer and storage of data that originate from either the source sensors or streamer receivers; for processor 208 to access stored data contained in data storage unit memory 232; for processor 208 to send information for visual display to display 226; or for the user to send commands to system operating programs/software 236 that might reside in either the processor 208 or the source and receiver interface unit 202.

System 200 can be used to implement method 800 for vectorization of a fast Fourier Transform to increase processing times of received underwater seismic data according to an embodiment. Hardware, firmware, software or a combination thereof may be used to perform the various steps and operations described herein. According to an embodiment, software 236 for carrying out the above discussed steps can be stored and distributed on multi-media storage devices such as devices 216, 218, 220, 224, 234, and/or 237 (described above) or other form of media capable of portably storing information (e.g., universal serial bus (USB) flash drive 426). These storage media may be inserted into, and read by, devices such as the CD-ROM drive 414, the disk drive 412, among other types of software storage devices.

According to an embodiment, implementation of methods 900, 1000, and 1100 can occur in a dedicated processor, or through the various functional blocks shown in FIG. 12. Those of ordinary skill in the art of the embodiments can appreciate that such functionality can be designed into various types of circuitry, including, but not limited to field programmable gate array structures (FPGAs), application specific integrated circuitry (ASICs), microprocessor based systems, among other types. A detailed discussion of the various types of physical circuit implementations does not substantively aid in an understanding of the embodiments, and as such has been omitted for the dual purposes of brevity and clarity. However, as well known to those of ordinary skill in the art, the systems and methods discussed herein can be implemented as discussed, and can further include programmable devices.

Such programmable devices and/or other types of circuitry as previously discussed can include a processing unit, a system memory, and a system bus that couples various system components including the system memory to the processing unit. The system bus can be any of several types of bus structures including a memory bus or memory controller, a peripheral bus, and a local bus using any of a variety of bus architectures. Furthermore, various types of computer readable media can be used to store programmable instructions. Computer readable media can be any available media that can be accessed by the processing unit. By way of example, and not limitation, computer readable media can comprise computer storage media and communication media. Computer storage media includes volatile and nonvolatile as well as removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by the processing unit. Communication media can embody computer readable instructions, data structures, program modules or other data in a modulated data signal such as a carrier wave or other transport mechanism and can include any suitable information delivery media.

The system memory can include computer storage media in the form of volatile and/or nonvolatile memory such as read only memory (ROM) and/or random access memory (RAM). A basic input/output system (BIOS), containing the basic routines that help to transfer information between elements connected to and between the processor, such as during start-up, can be stored in memory. The memory can also contain data and/or program modules that are immediately accessible to and/or presently being operated on by the processing unit. By way of non-limiting example, the memory can also include an operating system, application programs, other program modules, and program data.

The processor can also include other removable/non-removable and volatile/nonvolatile computer storage media. For example, the processor can access a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the operating environment include, but are not limited to, magnetic tape cassettes, flash memory cards, digital versatile disks, digital video tape, solid state RAM, solid state ROM and the like. A hard disk drive can be connected to the system bus through a non-removable memory interface such as an interface, and a magnetic disk drive or optical disk drive can be connected to the system bus by a removable memory interface, such as an interface.

The embodiments can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs and generally optical data storage devices, magnetic tapes, flash drives, and floppy disks. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to, when implemented in suitable electronic hardware, accomplish or support exercising certain elements of the appended claims can be readily construed by programmers skilled in the art to which the embodiments pertain.

The above-described embodiments are intended to be illustrative in all respects, rather than restrictive, of the different embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

We claim:

1. A method for simulating and displaying wave propagation using reflection seismology in a geographical area of interest, the method comprising:

converting signals associated with marine seismic soundwaves into digital electronic form, and storing the same as single precision floating numbers in an array of size N;

converting the real array of size N into a complex array of size N/2;

determining a first derivative of the following elastic wave equation—

$$\rho(x)\frac{\partial^2 u_i}{\partial t^2} - \frac{\partial}{\partial x_j}C_{ijkl}\frac{\partial}{\partial x_l}u_k = f_i$$

using the following equation—

$$Z'_k = i\left(\frac{N}{4} + \frac{N}{4}\sin\frac{2\pi k}{N} - k\right)Z_k + \frac{N}{4}\cos\frac{2\pi k}{N}Z^*_{k\dagger}$$

wherein said determination of the first derivative includes the determination of a fast fourier transform using an FFT vectorization scheme, $\rho$ is a density, u is a displacement vector, $c_{ijkl}$ is stiffness tensor, f is a force, $Z_k$ is the fourier transform of a set of numbers, k is an index from zero to N/2−1, k† is an index given by N/2−k, and $Z_k'$ is a differential operator;

using the calculated derivatives of the elastic wave equation to determine wavefield propagation underground; and processing the calculated derivatives into data that are used to display the determined wavefields so that underground geographical features in the underground geographical area of interest are determined.

2. The method according to claim 1, wherein the step of determining a first derivative of the elastic wave equation comprises:

combining sequential pairs of even $x_n^{(e)}$ and odd $x_n^{(o)}$ real numbers of the N-sized real array to form a plurality of sequential complex numbers z according to the following equation $$z_n = x_{2n} + ix_{2n+1} = x_n^{(e)} + ix_n^{(o)},$$

in which n=0, . . . , $$\frac{N}{2} - 1;$$

performing an FFT calculation of $z_n$ to obtain $Z_k$ using the FFT vectorization scheme, and then determining the complex conjugate and conjugate transpose of $Z_k$, $Z^*_{k\dagger}$;

using the following relationships to determine the first derivative, $Z_k'$, of the elastic wave equation by defining the frequency representation of $x_n^{(e)}$ and $x_n^{(o)}$ as—

$$X_k^{(e)} = \frac{1}{2}(Z_k + Z^*_{k\dagger}) \text{ and } X_k^{(o)} = \frac{-i}{2}(Z_k - Z^*_{k\dagger})$$

where k=0, . . . , $$\frac{N}{2} - 1, k_\dagger = \frac{N}{2} - k,$$

$X_k^{(e)}$ is the FFT of $x_n^{(e)}$, $X_k^{(o)}$ is the FFT of $x_n^{(o)}$ and $Z_k$ is the FFT of $z_n$;

splitting the FFT of $z_n$ into a size-N real array of even and odd terms according to the following—

$$X_k = \sum_{n=0}^{\frac{N}{2}-1} x_n^{(e)} e^{-i\frac{2\pi kn}{N/2}} + e^{-i\frac{2\pi k}{N}}\sum_{n=0}^{\frac{N}{2}-1} x_n^{(o)} e^{-i\frac{2\pi kn}{N/2}} = X_k^{(e)} + e^{-i\frac{2\pi k}{N}},$$

and therefore $$X_k = \frac{1}{2}\left[(Z_k + Z^*_{k\dagger}) - ie^{-i\frac{2\pi k}{N}}(Z_k - Z^*_{k\dagger})\right],$$

where k=0, . . . , $$\frac{N}{2} - 1$$

and can be extended to $$k = \frac{N}{2}$$

by defining $$Z_{\frac{N}{2}} = Z_o,$$

and $$X_{k\dagger} = \frac{1}{2}\left[(Z_k + Z^*_{k\dagger}) + ie^{-i\frac{2\pi k}{N}}(Z_k - Z^*_{k\dagger})\right]^*;$$

and having determined $Z_k$ and $Z_k^*$, determining the derivative of the elastic wave equation, $Z_k'$, according to the following—

$$Z'_k = i\left(\frac{N}{4} + \frac{N}{4}\sin\frac{2\pi k}{N} - k\right)Z_k + \frac{N}{4}\cos\frac{2\pi k}{N}Z^*_{k\dagger}.$$

3. The method according to claim 1, wherein the step of determining a fast Fourier transform using an FFT vectorization scheme comprises:

storing a first set of data in memory, such that the data is configured in a first array of N rows, and M columns;

reconfiguring the first array such that it is now comprises of N vectors each of length M, without moving any data of the first array;

calculating an FFT of the data stored in the first array configured as N vectors each of length M using a vectorization scheme; and returning the FFT result.

4. The method according to claim 3, wherein the vectorization scheme is a streaming, single instruction, multiple data (SIMD) extension (SSE) scheme.

5. The method according to claim 4, wherein the SSE is used to multiple a twiddle factor in the determination of the FFT.

6. The method according to claim 3, wherein the step of storing the data includes storing data in a three dimensional (3D) format, and further wherein the step of reconfiguring the first array includes determining that the set of vectors also includes Z sets of vectors, wherein each the Z sets of vectors includes N vectors of length M.

7. The method according to claim 1, wherein the steps of storing and determining first derivatives of the elastic wave equation comprise:
    storing three dimensional data in a three dimensional format; and
    determining the first derivatives in each of the three dimensions using an FFT vectorization scheme in a parallel manner, at substantially the same time.

8. A method for simulating and displaying wave propagation using reflection seismology in a geographical area of interest, the method comprising:
    transmitting a plurality of marine seismic sound waves by a plurality of transmitters;
    receiving one or more of the plurality of transmitted signals by a plurality of receivers;
    converting the received signals into digital electronic form, and storing the same as single precision floating numbers in an array of size N;
    converting the real array of size N into a complex array of size N/2;
    determining a first derivative of the following elastic wave equation—

$$\rho(x)\frac{\partial^2 u_i}{\partial t^2} - \frac{\partial}{\partial x_j}C_{ijkl}\frac{\partial}{\partial x_l}u_k = f_i$$

using the following equation—

$$Z'_k = i\left(\frac{N}{4} + \frac{N}{4}\sin\frac{2\pi k}{N} - k\right)Z_k + \frac{N}{4}\cos\frac{2\pi k}{N}Z^*_{k\dagger}$$

wherein said determination of the first derivative includes the determination of a fast Fourier transform using an FFT vectorization scheme, wherein $\rho$ is a density, u is a displacement vector, $c_{ijkl}$ is a stiffness tensor, f is a force, $Z_k$ is the fourier transform of a set of numbers, k is an index from zero to N/2−1, k† is an index given by N/2−k, and $Z_k'$ is a differential operator;
    using the calculated derivatives of the elastic wave equation to determine wavefield propagation underground; and
    processing the calculated derivatives to visually display the determined wavefields so that underground geographical features in the underground geographical area of interest are visually displayed and determined.

9. A system for simulating and displaying wave propagation using reflection seismology in a geographical area of interest, the system comprising:
    a processor configured to convert signals associated with marine seismic soundwaves into digital electronic form, and storing the same as single precision floating numbers in an array of size N, and wherein the processor is further configured to
    convert the real array of size N into a complex array of size N/2;
    determine a first derivative of the following elastic wave equation—

$$\rho(x)\frac{\partial^2 u_i}{\partial t^2} - \frac{\partial}{\partial x_j}C_{ijkl}\frac{\partial}{\partial x_l}u_k = f_i$$

using the following equation—

$$Z'_k = i\left(\frac{N}{4} + \frac{N}{4}\sin\frac{2\pi k}{N} - k\right)Z_k + \frac{N}{4}\cos\frac{2\pi k}{N}Z^*_{k\dagger}$$

wherein said determination of the first derivative includes the determination of a fast Fourier transform using an FFT vectorization scheme, wherein $\rho$ is a density, u is a displacement vector, $c_{ijkl}$ is a stiffness tensor, f is a force, $Z_k$ is the fourier transform of a set of numbers, k is an index from zero to N/2−1, k† is an index given by N/2−k, and $Z_k'$ is a differential operator, and further wherein the processor is further configured to
    use the calculated derivatives of the elastic wave equation to determine wavefield propagation underground, and
    process the calculated derivatives into data that are used to display the determined wavefields so that underground geographical features in the underground geographical area of interest are determined.

10. The system according to claim 9, wherein the determining a first derivative of the elastic wave equation by the processor comprises:
    the processor being further configured to
    combine sequential pairs of even $x_n^{(e)}$ and odd $x_n^{(o)}$ real numbers of the N-sized real array to form a plurality of sequential complex numbers z according to the following equation $$z_n = x_{2n} + ix_{2n+1} = x_n^{(e)} + ix_n^{(o)},$$

in which n=0, . . . , $$\frac{N}{2} - 1;$$

perform an FFT calculation of $z_n$ to obtain $Z_k$ using the FFT vectorization scheme, determine the complex conjugate and conjugate transpose of $Z_k$, $Z_{k\dagger}^*$,
    use the following relationships to determine the first derivative, $Z_k'$, of the elastic wave equation by defining the frequency representation of $x_n^{(e)}$ and $x_n^{(o)}$ as—

$$X_k^{(e)} = \frac{1}{2}(Z_k + Z^*_{k\dagger}) \text{ and } X_k^{(o)} = \frac{-i}{2}(Z_k - Z^*_{k\dagger})$$

where k=0, . . . , $$\frac{N}{2} - 1, k_\dagger = \frac{N}{2} - k,$$

$X_k^{(e)}$ is the FFT of $x_k^{(e)}$, $X_k^{(o)}$ is the FFT of $x_k^{(o)}$ and $Z_k$ is the FFT of $z_n$,
    split the FFT of $z_n$ into a size-N real array of even and odd terms according to the following—

$$X_k = \sum_{n=0}^{\frac{N}{2}-1} x_n^{(e)} e^{-i\frac{2\pi k n}{N/2}} + e^{-i\frac{2\pi k}{N}} \sum_{n=0}^{\frac{N}{2}-1} x_n^{(o)} e^{-i\frac{2\pi k n}{N/2}} = X_k^{(e)} + e^{-i\frac{2\pi k}{N}},$$

and therefore $$X_k = \frac{1}{2}\left[(Z_k + Z_{k_\dagger}^*) - ie^{-i\frac{2\pi k}{N}}(Z_k - Z_{k_\dagger}^*)\right],$$

where k=0, . . . , $$\frac{N}{2} - 1$$

and can be extended to $$k = \frac{N}{2}$$

by defining $$Z_{\frac{N}{2}} = Z_0,$$

and $$X_{k_\dagger} = \frac{1}{2}\left[(Z_k + Z_{k_\dagger}^*) + ie^{-i\frac{2\pi k}{N}}(Z_k - Z_{k_\dagger}^*)\right]^*;$$

and
having determined $Z_k$ and $Z_{k_\dagger}^*$, the processor is further configured to
determine the derivative of the elastic wave equation, $Z_k'$, according to the following—

$$Z_k' = i\left(\frac{N}{4} + \frac{N}{4}\sin\frac{2\pi k}{N} - k\right)Z_k + \frac{N}{4}\cos\frac{2\pi k}{N}Z_{k_\dagger}^*.$$

11. The system according to claim 9, wherein determining a fast Fourier transform using an FFT vectorization scheme by the processor comprises:
the processor being further configured to
store a first set of data in memory, such that the data is configured in a first array of N rows, and M columns;
reconfigure the first array such that it is now comprises of N vectors each of length M, without moving any data of the first array;
calculate an FFT of the data stored in the first array configured as N vectors each of length M using a vectorization scheme; and
return the FFT result.

12. The system according to claim 11, wherein the vectorization scheme is a streaming, single instruction, multiple data (SIMD) extension (SSE) scheme.

13. The system according to claim 12, wherein the SSE is used to multiple a twiddle factor in the determination of the FFT.

14. The system according to claim 11, wherein storing the data includes storing data by the processor in a three dimensional (3D) format, and further wherein reconfiguring the first array by the processor includes determining that the set of vectors also includes Z sets of vectors, wherein each the Z sets of vectors includes N vectors of length M.

15. The system according to claim 9, wherein storing and determining first derivatives of the elastic wave equation by the processor comprises:
the processor being further configured to
store three dimensional data in a three dimensional format; and
determine the first derivatives in each of the three dimensions using an FFT vectorization scheme in a parallel manner, at substantially the same time.

16. A system for simulating and displaying wave propagation using reflection seismology in a geographical area of interest, the system comprising:
a plurality of transmitters configured to transmit a plurality of marine seismic sound waves;
a plurality of receiver configured to receive one or more of the plurality of transmitted signals; and
a processor configured to
convert the received signals into digital electronic form, and storing the same as single precision floating numbers in an array of size N;
convert the real array of size N into a complex array of size N/2;
determine a first derivative of the following elastic wave equation—

$$\rho(x)\frac{\partial^2 u_i}{\partial t^2} - \frac{\partial}{\partial x_j}C_{ijkl}\frac{\partial}{\partial x_l}u_k = f_i$$

using the following equation—

$$Z_k' = i\left(\frac{N}{4} + \frac{N}{4}\sin\frac{2\pi k}{N} - k\right)Z_k + \frac{N}{4}\cos\frac{2\pi k}{N}Z_{k_\dagger}^*$$

wherein said determination of the first derivative includes the determination of a fast Fourier transform using an FFT vectorization scheme, $\rho$ is a density, u is a displacement vector, $c_{ijkl}$ is a stiffness tensor, f is a force, $Z_k$ is the fourier transform of a set of numbers, k is an index from zero to N/2−1, k† is an index given by N/2−k, and $Z_k'$ is a differential operator;
use the calculated derivatives of the elastic wave equation to determine wavefield propagation underground; and
process the calculated derivatives to visually display the determined wavefields so that underground geographical features in the underground geographical area of interest are visually displayed and determined.

* * * * *